Jan. 30, 1951 G. M. WALTERS ET AL 2,539,499
ELECTRICALLY OPERATED REFLEX CAMERA
Filed July 16, 1947 11 Sheets-Sheet 1

INVENTOR.
GEORGE M. WALTERS &
BY RUSSELL W. WALTERS.

Munn, Liddy + Glaccum
ATTORNEYS.

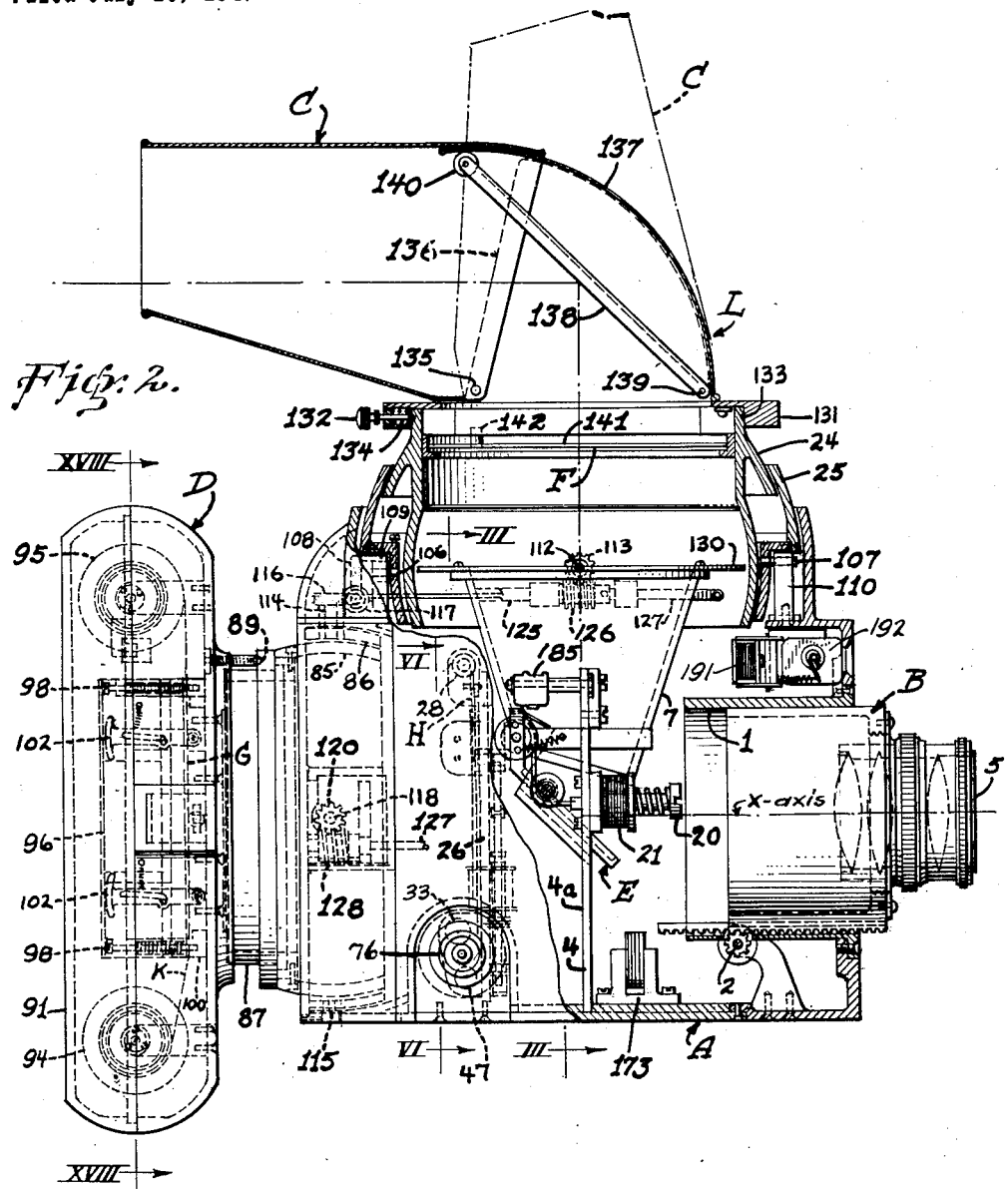

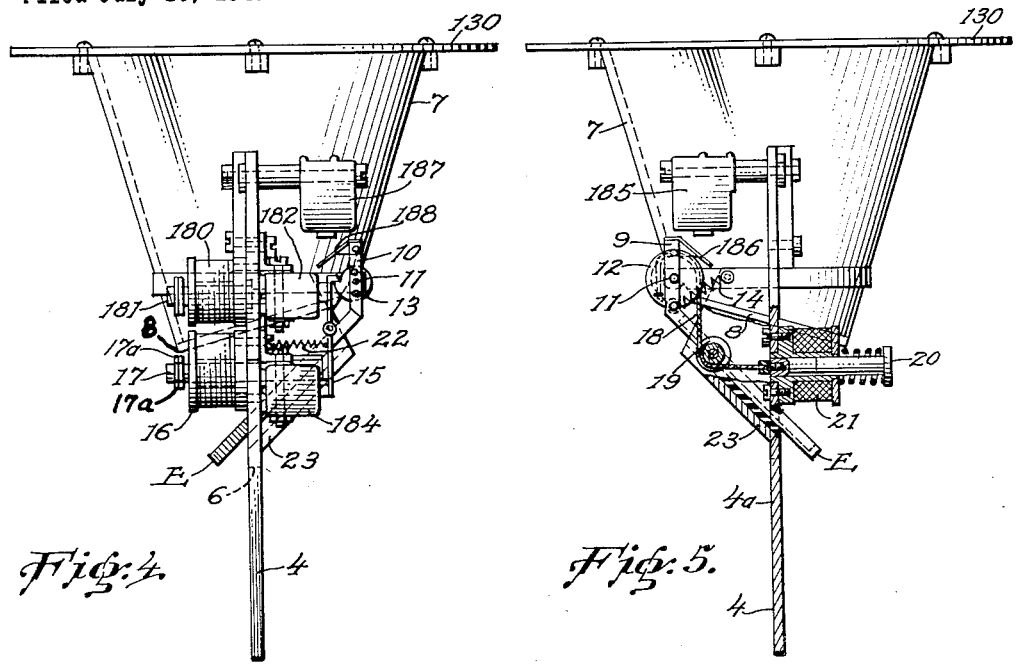

Jan. 30, 1951  G. M. WALTERS ET AL  2,539,499
ELECTRICALLY OPERATED REFLEX CAMERA
Filed July 16, 1947  11 Sheets-Sheet 4
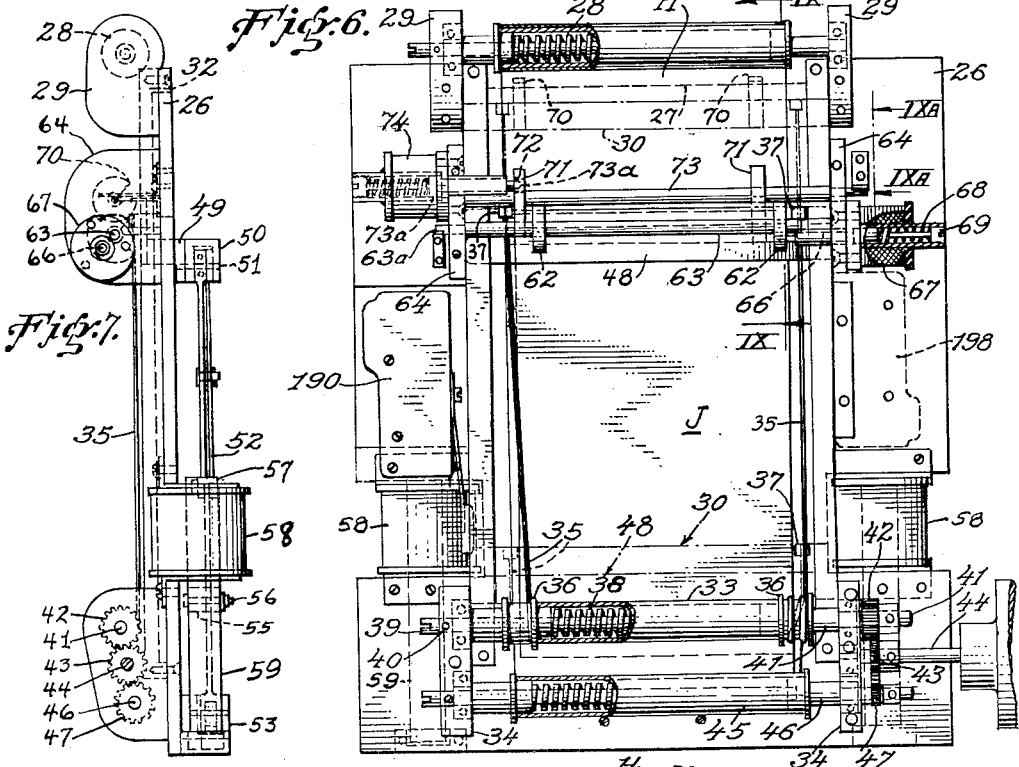
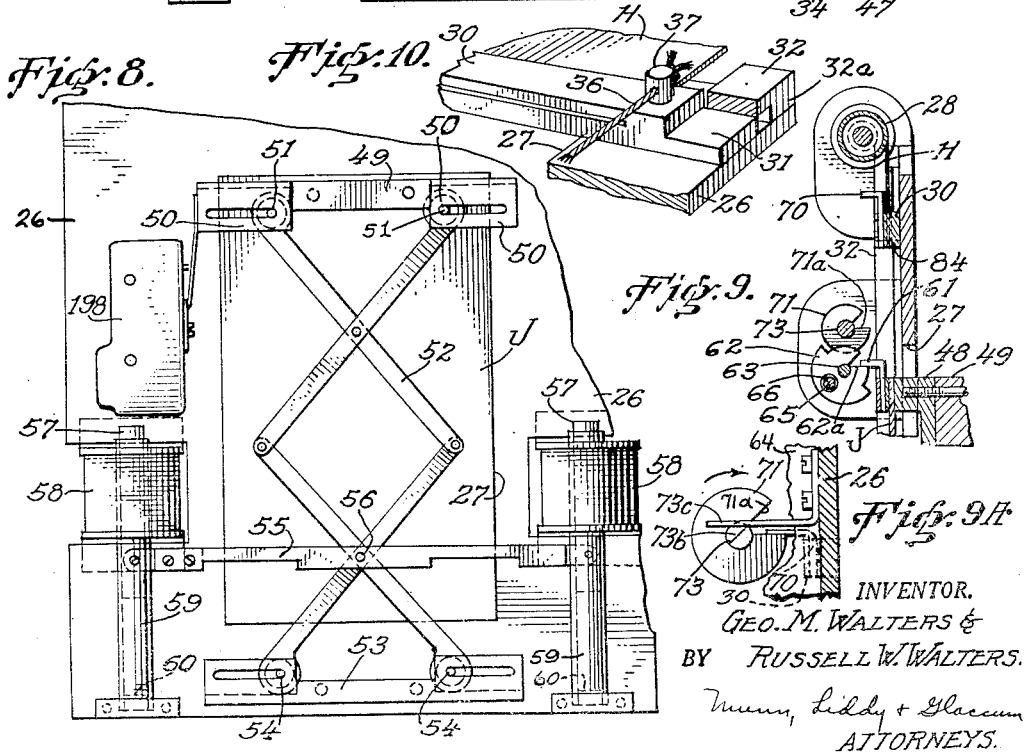
INVENTOR.
GEO. M. WALTERS &
BY RUSSELL W. WALTERS.
Murry, Liddy & Glaccum
ATTORNEYS.

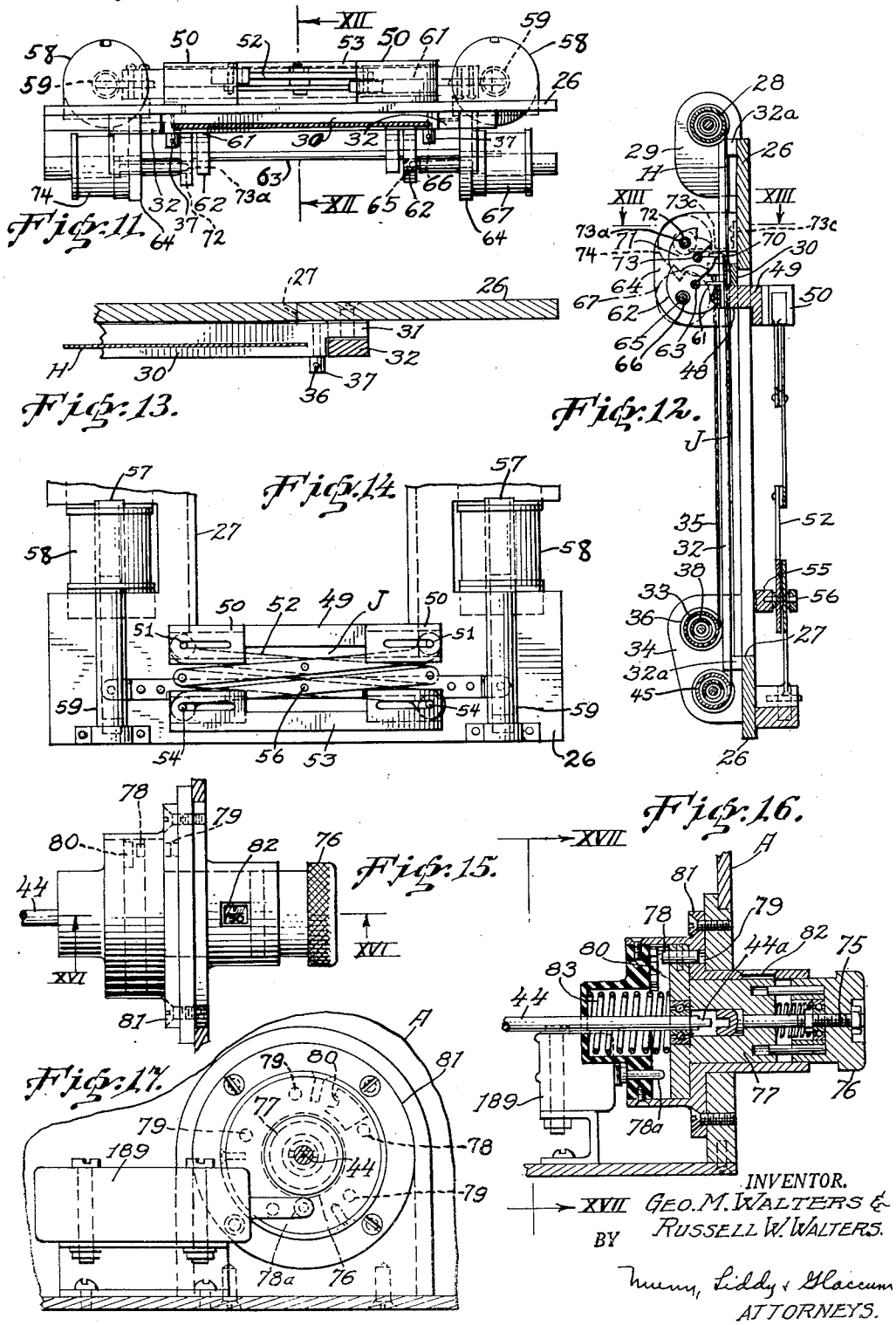

Jan. 30, 1951   G. M. WALTERS ET AL   2,539,499
ELECTRICALLY OPERATED REFLEX CAMERA
Filed July 16, 1947   11 Sheets-Sheet 6
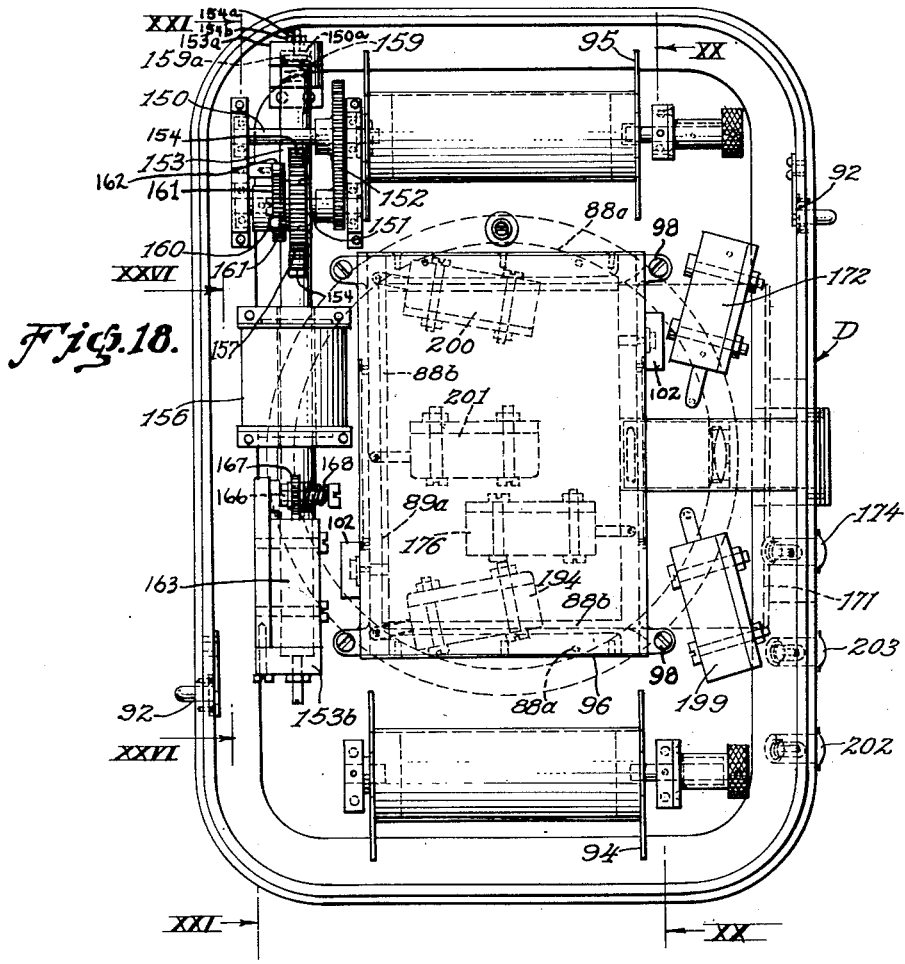
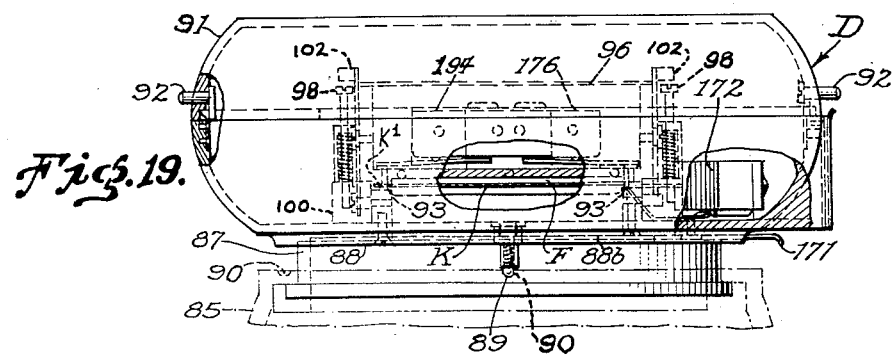
INVENTOR
GEO. M. WALTERS &
BY  RUSSELL W. WALTERS
Munn, Liddy & Glaccum
ATTORNEYS.

Jan. 30, 1951  G. M. WALTERS ET AL  2,539,499
ELECTRICALLY OPERATED REFLEX CAMERA
Filed July 16, 1947  11 Sheets-Sheet 7
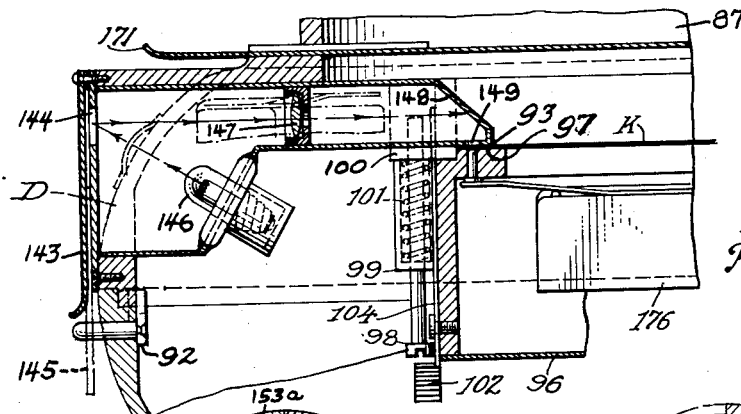
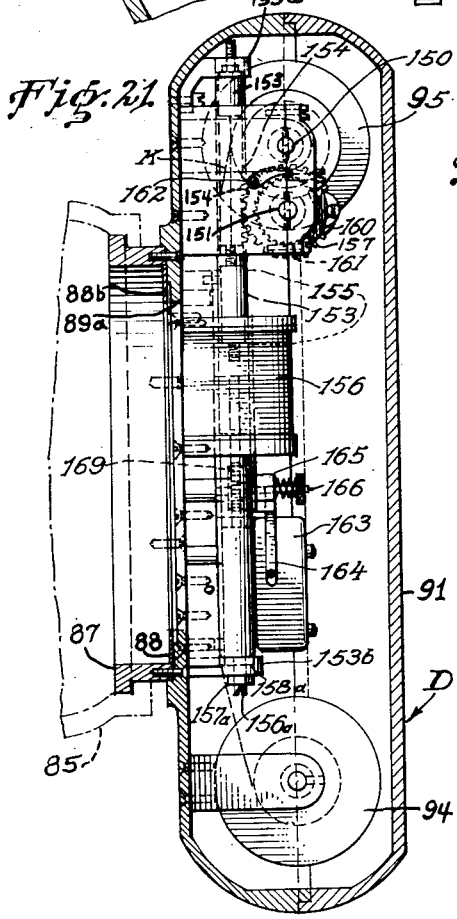
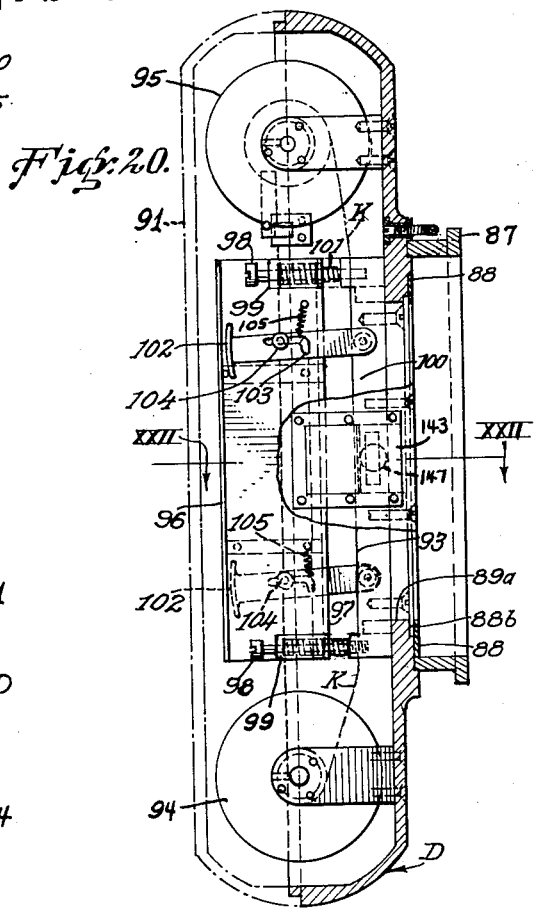
INVENTOR
Geo. M. Walters &
Russell W. Walters.
BY Munn, Liddy & Glaccum
ATTORNEYS.

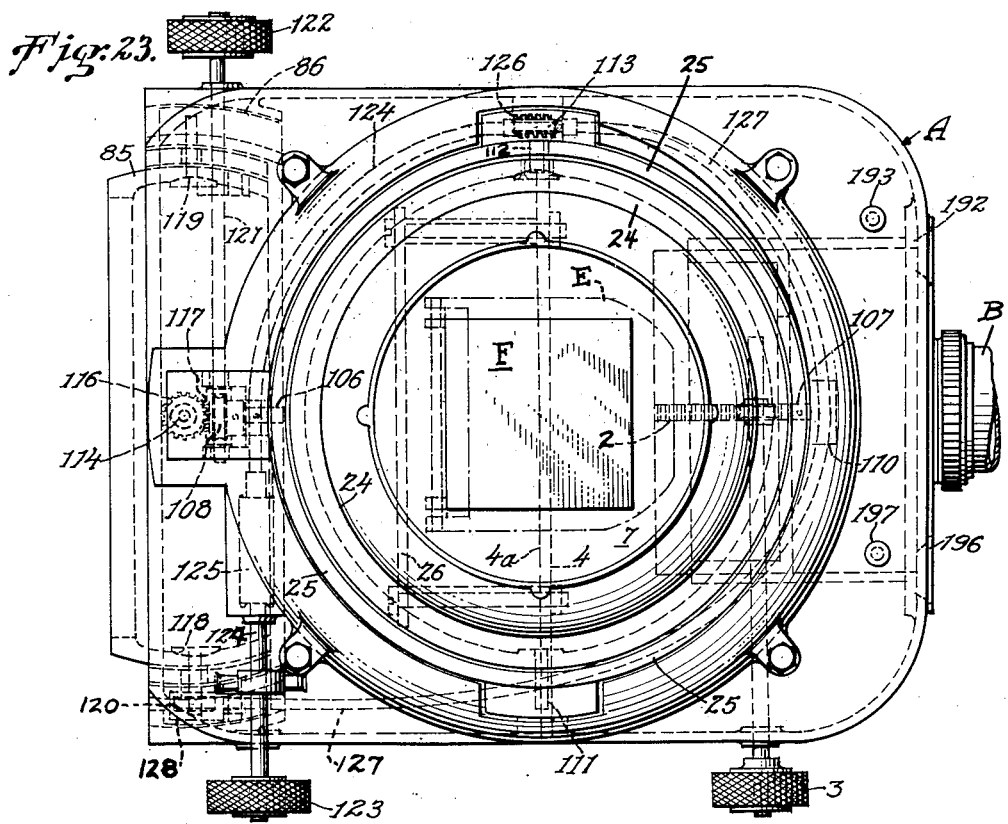
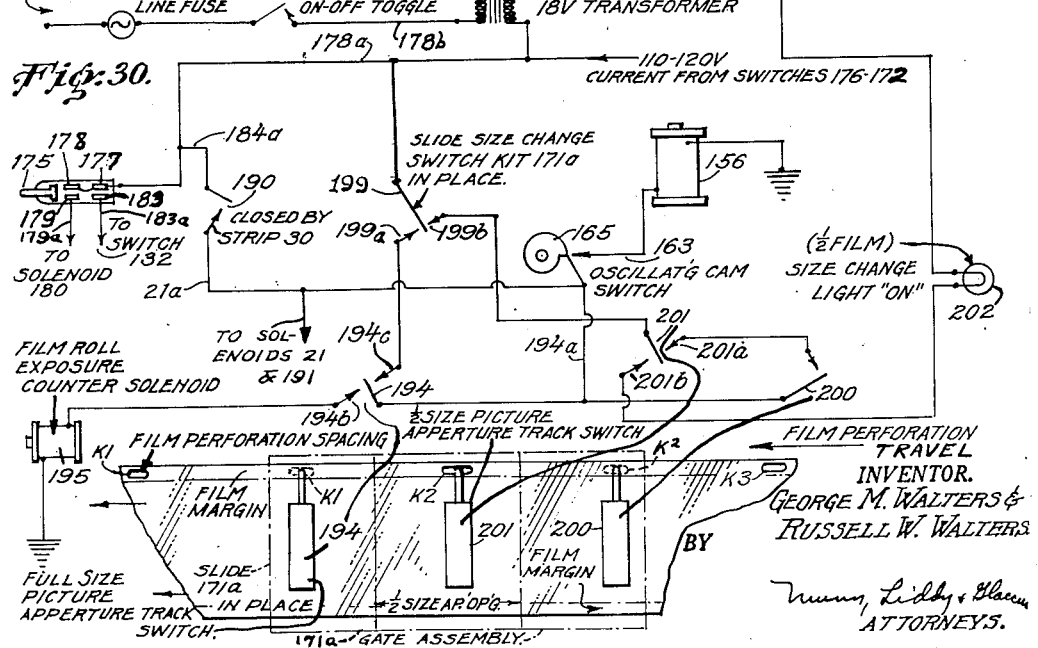

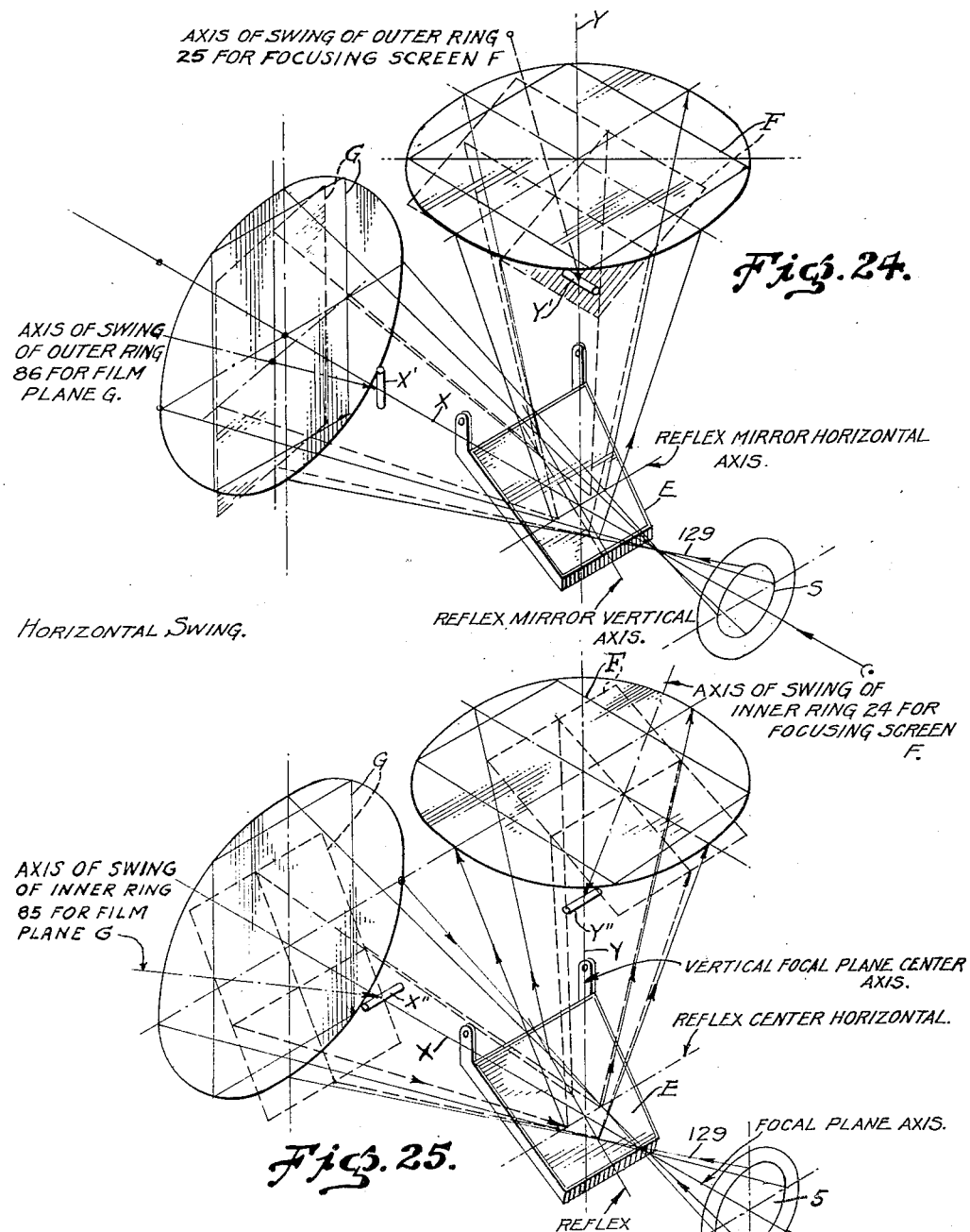

Jan. 30, 1951  G. M. WALTERS ET AL  2,539,499
ELECTRICALLY OPERATED REFLEX CAMERA
Filed July 16, 1947  11 Sheets-Sheet 10
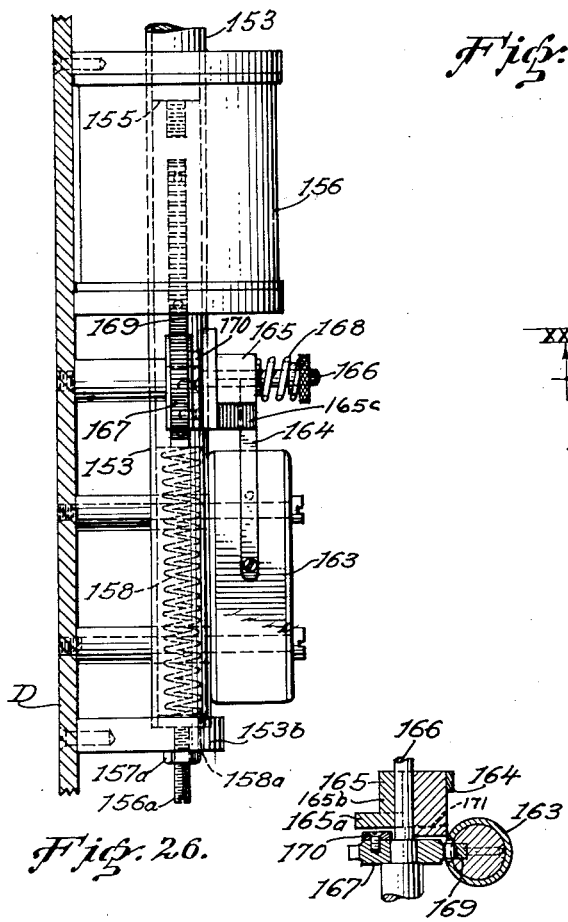
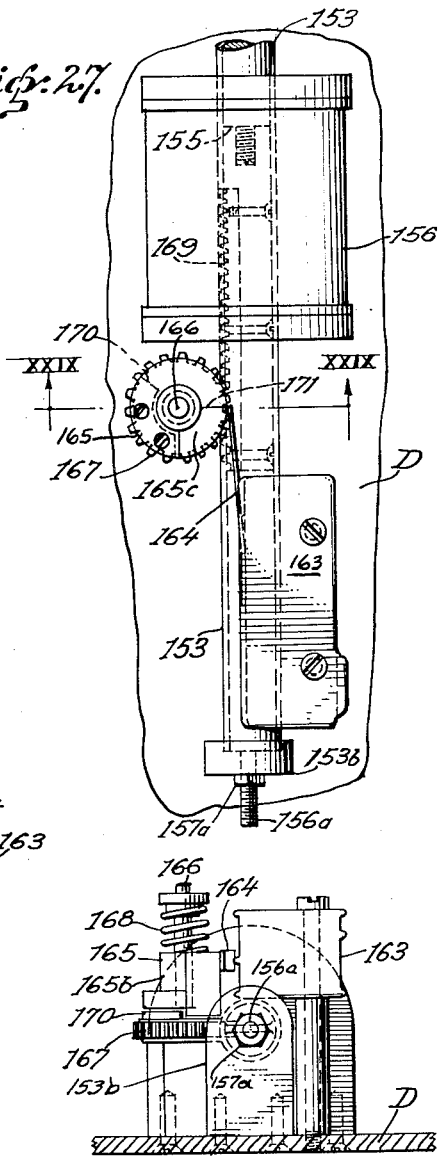
INVENTOR
GEO. M. WALTERS &
RUSSELL W. WALTERS.
BY
ATTORNEYS.

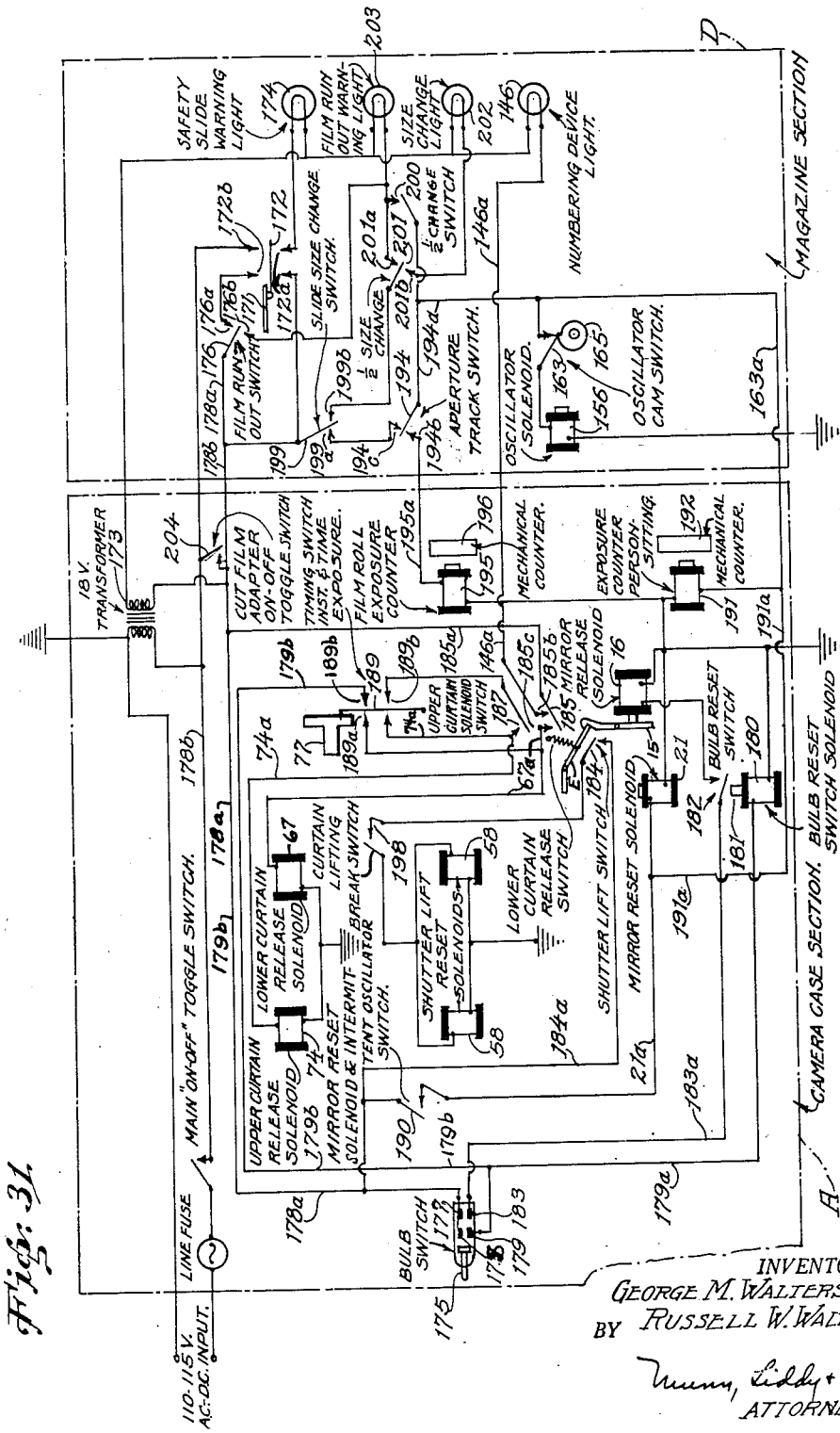

Patented Jan. 30, 1951

2,539,499

UNITED STATES PATENT OFFICE 2,539,499

ELECTRICALLY OPERATED REFLEX CAMERA

George M. Walters and Russell W. Walters, San Francisco, Calif.

Application July 16, 1947, Serial No. 761,186

13 Claims. (Cl. 95—42)

A broad object of our invention is to provide a single lens reflex type camera which eliminates the necessity of using twin lenses and permits the substitution of lenses of various focal lengths. The use of a single lens obviates the necessity of calculating the parallax.

A further object of our invention is to provide a camera of the reflex type which can be focused at or above eye level. The focusing hood may be swung from a vertical to a horizontal position and the hood may be rotated throughout a complete circle.

Still another object of our invention is to provide a device of the type described in which the photographic cycle is electrically operated by a switch attached to an electric cord permitting remote control. When roll film is used, the movement of the film between successive exposures is automatically effected.

Still a further object of our invention is to provide a curtain-type shutter capable of stopping the action of a moving subject and in which the size of the scanning shutter slot can be altered to let in the desired amount of light. The variation of the width of the slot and the control of the speed of its travel, permits a wide range of exposure time and action stoppage control. Novel means is used for photographing either or both the name of the subject and an identifying number on each negative.

A further object of our invention is to provide a reflex camera of the type in which the focusing screen is at an angle of ninety degrees to the film focal plane and in which novel means is used to coordinate the movement of the film plane with the focusing screen so as to synchronize their movements about both their vertical and horizontal axes.

A further object of our invention is to provide a reflex camera of the type described in which pictures of different sizes can be taken. The film movement mechanism can be changed to move different amounts of roll film between successive exposures, the amount being in accordance with the size of the opening that exposes the film portion registering therewith when the shutter is actuated. The size of the opening when smaller than the film aperture is provided by interposing a screen of opaque material between the film aperture and the shutter, this opaque screen having the opening of the desired smaller size. Novel means indicates when the operator may change from the smaller film size to the larger without film wastage.

A non-perforate screen or safety slide of opaque material can be placed over the sensitive film to prevent it from being exposed to the light when the film magazine is removed from the camera. So long as the safety slide is in position when the film magazine is connected to the camera, the camera cannot be operated because the slide opens a switch that connects the operating mechanism to a source of current. In this way, unexposed film is prevented from moving past the film aperture should the operator fail to remove the safety slide and try to operate the camera. The slide also closes a circuit to an indicating light that shows the slide is in the camera.

As a further precaution we have provided means for interrupting the input current after the last exposure on the film has been made and this makes the camera inoperative. The camera has means for indicating when the roll of film is exhausted. The camera will also indicate the amount of film exposed and the amount unexposed.

Other objects and advantages will appear in the following specification and the novel features will be set forth in the appended claims.

Our invention is illustrated in the accompanying drawings in which:

Figure 2 is a longitudinal section through the camera; portions being shown in elevation;

Figure 3 is a transverse section taken substantially along the line III—III of Figure 2, and shows a rear elevation of a mirror-actuating mechanism and light trap;

Figure 4 is a side elevation of Figure 3 when looking from the left hand side of this figure;

Figure 5 is a vertical section, taken substantially along the line V—V of Figure 3;

Figure 6 is a vertical section, taken substantially along the line VI—VI of Figure 2, and shows a rear elevation of the shutter-actuating mechanism, portions being shown in section for clarity;

Figure 7 is a side elevation of Figure 6, when looking from the right hand side of this figure;

Figure 8 is a front elevation of the shutter-actuating mechanism and illustrates the lifting means for the lower curtain;

Figure 9 is a vertical section taken substantially along the line IX—IX of Figure 6, and illustrates the rotating latches for the upper and lower curtains;

Figure 9A is a section taken along the line IXA—IXA of Figure 6 and shows the means for preventing the spinning of the rotatable latches;

Figure 10 is an enlarged perspective view of 2,539,499

Figure 1:
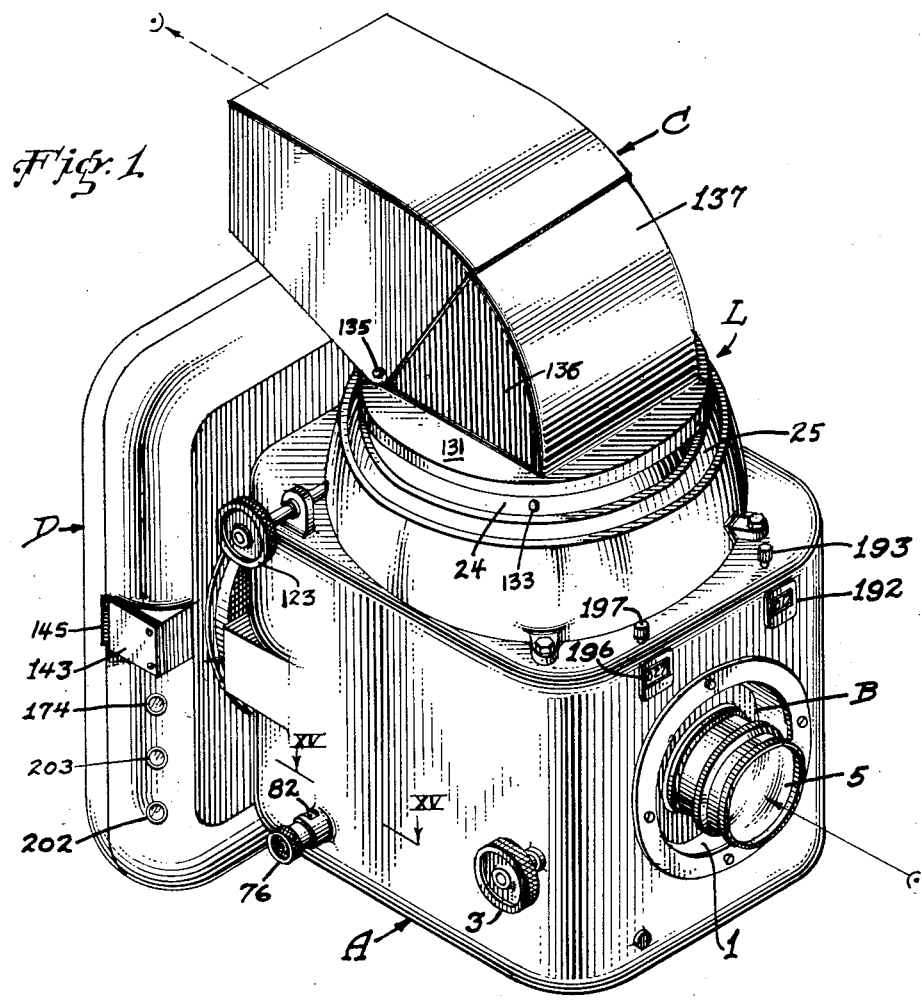
Figure 1 is a perspective view of the camera.

3 the manner of mounting the free end of the upper curtain;

Figure 11 is a top plan view of Figure 6;

Figure 12 is a vertical section, taken substantially along the line XII—XII of Figure 11;

Figure 13 is an enlarged horizontal section taken along the line XIII—XIII of Figure 12, and illustrates the guide for the upper curtain;

Figure 14 is a view of the lower portion of Figure 8 and shows the lower curtain lifting means, collapsed;

Figure 15 is an enlarged horizontal section taken along the line XV—XV of Figure 1, and shows a top plan view of the timing device for the shutter;

Figure 16 is a longitudinal section taken along the line XVI—XVI of Figure 15;

Figure 17 is a vertical section taken along the line XVII—XVII of Figure 16;

Figure 18 is an enlarged transverse section through the film magazine, with the rear magazine cover removed;

Figure 19 is a bottom plan view of Figure 18, a portion being shown in section for clarity with the rear cover of the magazine in place;

Figure 20 is a vertical section taken substantially along the line XX—XX of Figure 18;

Figure 21 is a vertical section taken substantially along the line XXI—XXI of Figure 18;

Figure 22 is an enlarged section taken along the line XXII—XXII of Figure 20, and illustrates the means for photographing characters on the film margin;

Figure 23 is a top plan view of the camera with the hood and the film magazine removed and showing the means for coordinating the movement of the film plane with the focusing screen so as to synchronize their movements about both their vertical and horizontal axes;

Figure 24 is an isometric optical drawing illustrating diagrammatically how the film plane is swung about its vertical axis simultaneously and in synchrony with the swinging of the focusing screen about its horizontal axis, the two axes lying in the same vertical plane;

Figure 25 is an isometric optical drawing illustrating diagrammatically how the film plane is swung about its horizontal axis simultaneously and in synchrony with the swing of the focusing screen about a horizontal axis that extends at right angles to the horizontal axis used in Figure 24;

Figure 26 is an enlarged section taken substantially along the line XXVI—XXVI of Figure 18, and shows a portion of the film actuating and control mechanism, in side elevation;

Figure 27 is a top plan view of Figure 26 and illustrates how a micro switch is controlled by the operation of the film moving mechanism;

Figure 28 is an end view of Figure 27;

Figure 29 is a transverse section taken along the line XXIX—XXIX of Figure 27;

Figure 30 is a combination wiring diagram and diagrammatic view illustrating how certain micro switches control the film movement for the half length film aperture exposures and full length aperture exposures; and Figure 31 is a wiring diagram of the various circuits used in operating the camera.

While we have shown the preferred form of our invention it should be understood that various changes or modifications may be made within the scope of the appended claims without departing from the spirit and scope of the invention.

4

In carrying out our invention, we will first describe the camera in general and then will set forth under appropriate headings the reflex mirror and its actuating mechanism; the shutter mechanism with its time, speed and slot-opening control; the film magazine with its film operating mechanism, film control switches, and character photographing means; the synchronized means for coordinating both the film plane and focusing screen in their vertical and horizontal swings; the focusing hood; and the wiring diagram and general operation of the reflex camera in taking time or instantaneous exposures.

REFLEX CAMERA IN GENERAL

Reflex cameras have several advantages over other types of cameras, but they also have several handicaps which have tended to limit their usefulness to the professional photographer. The greatest advantage that reflex cameras have over all other types is the ability of the operator to view the image in the exact size of the picture being taken up to the instant of exposure of the photographic film, plate, or other light sensitive material used.

Before describing the mirror actuating mechanism, the general camera construction will be mentioned and reference to Figures 1 and 2 shows it to comprise a box-like frame A with a telescoping cylindrical lens mount indicated generally at B that is slidably received in a cylindrical sleeve 1. A rack and gear shown at 2 moves the lens mount B and a control knob 3 is connected to the gear, see Figure 1. A camera hood C extends from the top of the box A and a camera film magazine D is rotatably and removably connected to the back of the box. Both will be described in detail later. The hood prevents extraneous light from striking a focusing screen and the film magazine supports the portion of film to be exposed, at the focal plane. Both the focusing screen and the film focal plane are the same focal distance from the mirror which will now be described.

(a) *Mirror and its actuating mechanism*

The mirror and the mechanism for swinging it into operative and inoperative position are illustrated in Figures 2 to 5, inclusive. A mounting panel for the mirror is indicated at 4 and it has sufficient width and height to shut off any protrusion of light rays from the lens 5. The panel is mounted within the camera box A at a point where the inner surface 4a of the panel forms the optical center of the camera. The panel has an aperture 6 of sufficient size to admit the cone of light from the lens 5 to the sensitized film plane, carried by the film magazine D.

The panel 4 carries a conical-shaped light trap 7 that has an inclined lower perimeter 8 defining an opening that is closed by the reflex mirror E when the latter is in inoperative position. The reflex mirror is mounted in a frame that has two supporting end arms 9 and 10 which are pivotally mounted on two shafts 11, carried by the side walls of the light trap at points adjacent to the rear wall. The end support 9 is secured to a pulley 12, while the end support 10 carries a rotatable stop 13, see Figure 4. A coil spring 14 urges the reflex mirror into closed or inoperative position, and a pivoted pawl 15 engages with the stop 13 for holding the mirror in operative position which is the position shown in Figures 2 to 5 inclusive. A mirror release solenoid 16 has a plunger 17 for freeing the pawl 15 from the stop 13 when the solenoid is energized and the spring 14 will cause the reflex mirror to close the lower end of the light trap 7. The plunger 17 has lock nuts 17a to limit its movement.

In Figure 5 we show a cable 18 secured to the pulley 12 and passed around a portion of the pulley and then around an idler 19, the free end of the cable being secured to a plunger 20 of a reset solenoid 21. When the solenoid 21 is energized in a manner hereinafter described, the cable 18 will rotate the pulley 12 to open the mirror and swing it into operative position. A spring 22, see Figure 4, causes the pawl 15 to again engage the stop 13 for holding the reflex mirror in operative position. The pawl 15 when swinging to engage stop 13 will reset plunger 17 of the solenoid 16. Stop brackets 23 are carried by the panel 4 and position the mirror at the proper 45° angle when the mirror is swung into operative position by the cable 18. The stop brackets and the rotatable stop 13 with the pawl 15 co-act to hold the mirror against movement in the camera when the mirror is in its reflex position.

The light trap 7 bisects the panel in its optical center. In other words the vertical axis of the light trap coincides with the surface 4a of the panel. The sloping sides of the light trap correspond to the angle of light rays reflected by the reflex mirror E when the mirror is in operative position. Figure 2 illustrates the top of the light trap lying in a horizontal plane that coincides with the pivotal center of two swing rings 24 and 25, the inner one of which supports the focusing screen F. The construction and operation of these swing rings will be explained more in detail hereinafter. Suffice it to say that the focusing screen F is at the same focal distance from the reflex mirror E as is the sensitized film plane G, carried by the film magazine D. Therefore, the operator knows that when he obtains a clear image on the focusing screen by using the reflex mirror, the same image will be thrown on the sensitized film at the film plane G when the mirror is swung into inoperative position and the shutter caused to pass its shutter slot over the film plane.

The reflex mirror E in swinging from open to closed position, moves through an arc of 30°. When the mirror is closed, the light trap 7 and mirror will prevent any light rays from finding their way into the interior of the camera. Therefore all light rays from the focusing screen F will be prevented from reaching the sensitized film. When the mirror is at its 45° or operative position, it will bisect the admitted imaged light rays from the lens 5 and will reflect the light rays upwardly to the focusing screen. When the mirror is closed or in inoperative position, the focused image will be projected onto the film plane G as soon as the shutter mechanism is actuated. The mirror brackets 23 clear the cone of light from the lens 5 when the mirror is swung into closed position. The brackets have cushioned stops on their flanges and a light tight closure is made between the mirror and brackets when the mirror is in its reflex position.

(b) *Shutter mechanism*

The shutter and its operating mechanism are illustrated in Figures 2 and 6 to 17, inclusive. We provide a mounting panel 26 which is positioned in back of the reflex mirror mounting panel 4, see Figure 2. The panel has a rectangular aperture 27 of sufficient size to admit rays of light from the lens 5 to the film plane G. The aperture 27 defines the shutter opening.

We provide two movable curtains of flexible and opaque material to control the passage of light rays through the shutter opening. An upper curtain H, see Figures 6 and 12, is attached to an upper spring roller 28, which in turn is rotatably carried by a pair of brackets 29 that are secured to the panel 26. The upper curtain when unrolled from the roller 28 is adapted to extend over the shutter aperture 27 to cover it. The free end of the curtain H is secured to a strip 30, see Figure 10, that acts as a reinforcing member and the strip carries ears 31 which are slidably received under guides 32, carried by the panel 26. Figure 12 shows the upper and lower ends of the guides 32 with abutments 32a attached to the panel 26 and spacing the guides a sufficient distance to provide slots that will slidably receive the ears 31.

We provide means for pulling the upper curtain H, downwardly over the shutter opening 27. Figure 6 shows a spring roller 33 mounted on the panel 26 between brackets 34 that are positioned near the lower end of the opening. Cables 35 are secured to the roller 33 and are wrapped around drum portions 36 on the roller. The free ends of the cables are connected to projections 37 that extend from the strip 30, see Figure 10. The coiled spring in the roller 33 is stronger than the coiled spring in the roller 28, so that a freeing of the roller 33 by means presently to be described, will cause the spring to rotate the roller 33 to quickly wind the cables 35 on the drum portions 36 in order to unwind the curtain H from the roller 28 and rapidly move it across the shutter opening 27.

The coiled spring 38 housed within the roller 33 has one end connected to a central shaft 39, this shaft extending through the left hand bracket 34 in Figure 6, the other hand of the spring being connected to the roller. The tension of the spring 38 can be set by rotating the shaft 39 within the roller and then locking the shaft to the left hand bracket by a set screw 40. In this way the speed of the shutter curtain is regulated. The right hand end of the roller 33 is carried by and is integral with a shaft section 41 that is rotatably mounted in the right hand bracket 34 of Figure 6. Rollers 45 and 28 are constructed in like manner to roller 33 for spring tension adjustment. A gear 42 is keyed to the shaft section 41 and meshes with an intermediate control gear 43, mounted on a control shaft 44.

Associated with the upper curtain H is a lower curtain J that is wrapped around a spring roller 45, the roller being mounted in the brackets 34 and having a right hand shaft portion 46 rigidly connected thereto and rotatably mounted in the right hand bracket 34 of Figure 6. The shaft portion 46 carries a gear 47 that meshes with the idler control gear 43. The free end of the lower screen J is connected to a reinforcing strip 48, see Figure 9, and the strip is connected to a lower curtain lifting bar 49, see Figure 12. The two ends of the lifting bar 49 carry inverted U-shaped members 50 which are slotted to slidably receive pins 51, see Figure 8, that are supported by the upper ends of a lazy tong construction indicated generally at 52.

A supporting bar 53 is disposed at the lower portion of the panel 26 and has slots at its ends for slidably receiving pins 54, carried by the lower ends of the lazy tong construction 52. A lazy tong actuating bar 55 or solenoid suspended lift carriage is pivotally secured to the lazy tong construction at 56, see Figure 8, by a lift arm shaft and the ends of the bar are secured to two solenoid cores or armatures of paramagnetic material 57 that are slidably received in solenoids 58. The solenoids are supported by the panel 26 and have tubes 59 in which the cores 57 are slidably mounted. The tubes are slotted to permit the ends of the carriage 55 to be connected to the cores and slide in the slots. Suitable stop shock cushions 60 are placed at the lower ends of the tubes to receive the cores 57 when they are in their lowermost position.

Figure 14 illustrates the lazy tongs 52 collapsed with the lower curtain J uncovering the shutter aperture 27 and the unused portion of the curtain wound on the lower spring roller 45. Figure 8 shows the lazy tong extended by the energizing of the solenoids 58, the lifting of the cores 57 and the raising of the carriage 55 which in turn extends the lazy tongs will raise the bar 49 and the strip 48 with the curtain J and will also raise the upper curtain H either by means of the gears 47, 43, 42 being in mesh or by contact of the upper and lower curtain reinforcing strips when gears 43 and 47 are disengaged, see Figure 6.

In order to support the lower curtain J in its raised position when the solenoids 58 are deenergized, we provide the strip 48 with two spaced apart lower curtain latch pawls 61, see Figure 9, that engage with the lower edges of recesses provided in rotatable latches 62, carried by a shaft 63. The shaft 63 in turn is rotatably mounted in side brackets 64. The left end of the shaft 63 has a flat portion, see Figure 6, which contacts a frictional spring stop 63a the function of which will be explained later. The right hand rotatable pawl 62 in Figure 11 has an opening 65 for receiving the end of a lower curtain latch core 66. The core reciprocates in a solenoid coil 67, and Figure 6 illustrates a spring 68 for urging the core 66 into the opening 65, see Figure 11, for holding the right hand pawl 62 and the shaft 63 from rotating. The pawls 61 will therefore hold the lower curtain in raised position. An energizing of the coil 67 will move the core 66 to the right in Figure 6 and release it from the rotatable pawls 62. The lower spring roller 45 will instantly wind the lower curtain and cause it to uncover the shutter opening 27. The movement of the solenoid core 66 to the right in Figure 6 is limited by an adjustable stop 69.

The upper curtain H is likewise held against being pulled over the shutter opening 27 by pawls 70 that are secured to the strip 36, see Figure 9. The pawls 70 are normally received in recesses provided in rotatable pawls 71 that are mounted on a shaft 73 which is rotatably carried by the brackets 64. The left hand rotatable pawl 71 shown in Figure 6 has an opening 72 for receiving the free end of a solenoid core 73a of the same construction as the core 66. A solenoid coil 74 receives the core 73a and its construction is the same as the coil 67. On energizing the coil 74, it will withdraw the core 73a from the pawl 71 and permit the lower spring roller 33 to immediately wind the cables 35 and move the upper curtain down over the shutter opening 27.

The curtains in moving downwardly under the tension of their spring rollers will cause the latches 61 and 70 to move past the rotatable latches 62 and 71 with sufficient speed to tend to rotate the latter. This would likely dispose the recesses 62a and 71a out of line with the latches 61 and 70 on their return movement. To prevent this the shaft 63 is provided with a flat portion for receiving the flat spring 63a when the latch 61 clears the recess 62a. This arrangement is duplicated for the shaft 73 which is shown in Figure 9A.

In Figure 9A, the flat portion 73b on the right hand end of the shaft 73 is shown at a 45° angle to a leaf spring 73c that is carried by the panel 26. When the latch 70 passes through the recess 71a of the pawl 71, it will rotate the pawl and shaft 73. The spring 73c will permit only a 45° rotation and then will stop further rotation of the shaft because it will contact the flat portion 73b. The pawl 71 will therefore have its recess 71a in a position to receive the latch 70 on its return movement.

When taking a time exposure, the operator first energizes the solenoid 67 in a manner hereinafter described and releases the lower curtain J which is immediately wound up on the lower roller 45 by the action of the coiled spring within the roller. This uncovers the shutter opening and exposes the film. After the proper time period elapses, the operator energizes the solenoid 74 which permits the roller 33 to move the upper curtain over the shutter opening to close it, thus ending the time exposure of the film.

(c) *Timing device mechanism*

This control mechanism is illustrated in Figures 1, 2, and 15 to 17, inclusive. The gear 43 is keyed to the control shaft 44, Figure 6, and this shaft has a non-circular end 44a designed to receive a non-circular socket of a plunger 75, see Figure 16. A knob 76 moves the plunger 75 into engagement with the shaft end 44a for rotating the gear 43. The gear 43 normally meshes with the gears 42 and 47, see Figure 6, so that a rotation of the roller 45 to wind up the lower curtain J will cause the roller 33 to rotate in unison therewith to move the upper curtain H over the shutter opening.

In a time exposure, the gear 43 is moved out of mesh with the gear 47 so that the roller 45 can open the shutter when the solenoid 67 is energized without the upper curtain H immediately covering the shutter opening which would be the case if the gear 43 were in mesh with both gears 42 and 47. To effect a time exposure, the knob 76, see Figure 16, is moved inwardly far enough to cause the plunger 75 to engage the shaft 44, whereupon further inward movement of the knob will cause it to move a time change selector drum 77 inwardly and to move a pin 78, carried by the flange of the drum, out of an opening 79. The knob can now be rotated clockwise in Figure 17 for bringing the pin against a recessed plate 80. The pin 78 bears against the inner surface of a flange 81, see Figure 16, when in this position, and will cause the shaft 44 to hold its gear 43 out of mesh with the gear 47 and permit the two curtains to operate independently for a time exposure in the manner already described. When the drum 77 is moved inwardly for a time exposure, it will depress a contact actuating button 78a for a purpose set forth in the wiring diagram, Figure 31.

When it is desired to change the speed at which a substantially instantaneous picture is taken, the knob 76 is rotated to move the pin 78 away from the plate 80 shown in Figure 17. The perspective view of the camera in Figure 1 shows the knob 76 preferably mounted at a point on the camera case looking from the magazine end toward the lens 5, where it will be at the lower right side and near the rear of the camera box. The knob 76 may be termed the manual time change knob. The drum 77 has indexed time settings on its periphery and viewable through a window 82, see Figure 16. As the knob 76 moves the pin 78 away from the plate 80, the pin will come into registry with any one of a plurality of openings 79 and if the knob is not kept depressed, a compression spring 83 will move the pin into the registering opening.

For each opening 79 there is a corresponding time figure on the drum periphery such as the fraction 1/50 shown in Figure 15, this fraction standing for 1/50 of a second and registering with the window when the pin 78 is received in the opening. Referring to Figure 6, it will be noted that when the knob 76 is depressed and moves the drum 77 to free the pin 78 from an opening 79, the shaft 44 is moved longitudinally to slide the gear 43 out of mesh with the gear 47 while still keeping the gear 43 in mesh with the gear 42. The gear 43 is moved out of mesh with the gear 47 before the knob 76 can be rotated. A rotation of the knob to a new time setting will also rotate the shaft 44 and the gears 43 and 42. The rotation of the gear 42 will rotate the roller 33 and if a relatively "slow" exposure is to be taken, the roller will pay out the cables 35 and permit the upper roller 28 to wind up a portion of the upper curtain to create a larger slot width 84 between the free ends of the adjacent curtain ends, see Figure 9. The amount of the opening for the slot determines the amount of light reaching the sensitized film. If a very short exposure is to be made of a fast moving object, the slot is made very narrow. A freeing of the knob and the entering of the pin 78 in the desired opening 79, again connects the gear 43 with the gear 47 in its new relation.

The knob 76 is rotatable through an arc of 330°. The operator depresses the knob before rotating it and frees the knob when the desired time fraction appears in the window. The recesses in the upper curtain rotating pawls 71, see Figure 9, permit the pawls 70, carried by the bar 30 of the upper curtain H, to move out of the recesses as the slot 84 is widened between the two curtain ends. Gear 42 has twice the face length of the gear 47 to permit adjustment of the slot width. The slot 84 when adjusted by the timing device allows light to project between the upper and lower curtains when the curtains are tripped by the solenoids 67 and 74, which are energized simultaneously for taking the picture. The gears 47, 43 and 42 maintain the same width of the slot as the two curtains move downwardly upon the energizing of the solenoids. The ends of the two curtains H and J abut each other as shown in Figure 12 when the timing device is set for taking a time exposure. This feature has already been explained. The circuits controlling the energizing of the solenoids 67 and 74 will be explained hereinafter.

Figure 6 shows in full line position, the two curtains H and J at the start for taking a time exposure. The dot dash line position at the bottom of the aperture opening shows the two curtains after completing the time exposure. At the top of the figure the dot dash line position of the upper curtain is shown raised above the top of the lower curtain for the purpose of taking an instantaneous exposure. The distance between the curtains at their top positions is controlled by the knob 76 and the gears 41, 43 and 47 maintain this same distance or shutter slot opening during the movement of the curtains downwardly over the film aperture.

(d) *Film magazine*

The film magazine is illustrated in detail in Figures 2 and 18 to 22, inclusive. In Figure 2, we show inner and outer swing rings 85 and 86, respectively, mounted in the open back of the camera box A. The film magazine has a magazine attachment ring 87 which is rotatably received in the outer end of the inner swing ring 85. The ring 87 has a groove for the ring 85 and the groove has three openings in its side wall for receiving three lugs carried by the swing ring 85. This permits the insertion of the magazine attachment ring 87 within the swing ring 85, see Figure 19. A spring-pressed ball 89 is carried by the magazine and enters either one of two recesses 90 disposed 90° apart and this permits the magazine to be arranged in a vertical position or a horizontal position. Figures 1 and 2 illustrate the film magazine in a vertical position.

The magazine D has an annular recess for receiving the ends of the magazine attachment ring 87 and a safety slide guide support 88 is placed within the ring 87 and is secured to the magazine D by screws 88a seen Figure 18. A rectangular slot 88b is formed in the magazine D and under the disc 88 so as to receive a safety slide 171 or a size change slide 171a, both of which slides will be explained more in detail hereinafter. The slide 171 or the slide 171a when in place, overlaps a magazine aperture opening 89a so as to make a light proof closure.

The magazine D has a rabbeted rear cover 91 that is removably held in a closed position by spring catches 92, see Figures 18 and 22. Figure 19 illustrates two parallel film runways 93 spaced apart for slidably receiving the sides of the film K. The film is fed from a film feed spool 94 to a film take-up spool 95, the spools being disposed at opposite ends of the film magazine as indicated in Figure 18. We provide an aperture gate assembly 96 for holding the portion of the film lying between the two spools, down upon the runners 93. The gate assembly has corresponding runners, on film guide surfaces 97, see Figure 22, that slidably hold the film K on the runners 93. Figure 20 shows how the gate assembly 96 can move away from the runners 93 in order to permit the film K to be threaded between the runners and carriage. Guide bolts 98 are placed at the four corners of the gate assembly frame and are slidably received in brackets 99, secured to the gate assembly, the bolts projecting from and being secured to the aperture assembly 100 of the magazine which includes the runners or film guides 93. see Figure 20. Coil springs 101 on the bolts bear against the brackets 99 and yieldingly urge the gate assembly 96 away from the aperture assembly 100.

Latches 102 are pivotally secured to the aperture assembly and have bayonet slots 103 that receive pins 104 carried by the aperture gate assembly 96. Figure 2 shows the pins 104 held in the transverse portion of the slots 103 by the latch springs 105 and in this way the aperture gate assembly is held down on the aperture assembly 100. The arrangement keeps the portion of film passing between the guides in the film plane G.

(e) *Synchronized means for coordinating the vertical and horizontal swings of the film plane and focusing screen*

Figures 2 and 23 illustrate the outer swing ring 25 for the focusing screen F as being pivotally mounted on trunnions 106 and 107 that are in alignment with each other and lie in a vertical plane that extends through the focal longitudinal axis $x$ of the lens system 5. The trunnion 106 has a worm gear 108 keyed thereto and the trunnion is rotatably mounted in a supporting bracket 109. The front trunnion 107 is rotatably mounted in a supporting bracket 110 which in turn is connected to the camera box A.

Figure 23 shows the inner swing ring 24 pivotally supported on a horizontal axis by axially aligned trunnions 111 and 112 that are rotatably carried by the outer swing ring 25. The trunnions 111 and 112 lie in the same plane as the trunnions 106 and 107 and the common axis of the first mentioned pair of trunnions extends at right angles to the common axis of the other pair of trunnions. Figure 2 shows the trunnion 112 with a worm gear 113 keyed thereto for a purpose presently to be described.

Figure 2 further illustrates the outer swing ring 86 for the film magazine D as having vertically arranged and diametrically opposed trunnions 114 and 115, both of which are supported by the camera box A. A worm gear 116 is keyed to the upper trunnion 114 and is in mesh with a worm 117 which also meshes with the worm gear 108. In Figure 23, we show the inner swing ring 85 pivotally secured to the outer swing ring 86 by trunnions 118 and 119. These trunnions are axially aligned and their common axis intersects the common axis of the trunnions 114 and 115 at right angles. The trunnion 118 has a worm 120 keyed thereto, see Figure 2.

We swing the outer swing rings 25 and 86 simultaneously and in synchrony with each other by rotating the worm 117 by means of a shaft 121 and a control knob 122, see Figure 23. The same figure shows another control knob 123 connected to a flexible shaft 124 that is passed through a supporting bearing 125, the shaft being connected to a worm 126 that meshes with the worm gear 113. A second flexible shaft 127 extends from the worm 126 to a worm 128 that meshes with the worm gear 120, see Figure 2. A turning of the knob 123 will simultaneously swing both the inner swing rings 24 and 85 in synchrony with each other and this is accomplished through the two flexible shafts 124 and 127 and the worms 126 and 128.

With the two sets of swing rings just described, it is possible to adjust the focal plane G of the film with respect to the camera angle being used to photograph the subject. The focusing screen F is connected to the sensitized film plane G by the swing rings and associate mechanism so that the two will move in synchrony together about the vertical and horizintal axes and will be properly coordinated. In order to clear this point up more fully, we have made two diagrammatic drawings in Figures 24 and 25, the former figure indicating the horizontal swing of the parts and the latter figure indicating the vertical swing.

Referring to Figure 24, the lens 5 is shown as directing a cone of light rays 129 onto the reflex mirror E. The focal plane horizontal center axis from the lens 5 to the film plane G is indicated by the axis $x$. This axis strikes the mirror E when the mirror is at its 45° position and we show a focal plane vertical center axis $y$ extending upwardly from the mirror at the point of intersection with the axis $x$. The vertical axis $y$ projects through the center of the focusing screen F of ground glass. A turning of the knob 122 in Figure 23 will swing the outer ring 86 about its vertical axis to swing the film plane G into the dash line position shown, the vertical pivotal axis for the plane G being shown at $x'$ and corresponding to the axis for the trunnions 114 and 115 in Figure 2.

At the same time the outer swing ring 25 for the focusing screen F is swung about its horizontal axis $y'$ which corresponds to the axis of the trunnions 106 and 107 in Figure 2. A swung position of the focusing screen is shown by the dash lines in Figure 24. The photographer will therefore see exactly the same image on the focusing screen F as will be thrown on the film G when the mirror E is moved out of the cone of light and the shutter mechanism is tripped.

Figure 25 illustrates the vertical swing when the knob 123 is rotated. This knob controls the swing of the inner rings 24 and 85 through the flexible shafts 124 and 127 and the worms 126 and 128, see Figures 2 and 23. A turning of the knob 123 will swing the film plane G about a horizontal axis $x''$ which corresponds to the axis of the horizontal trunnions 118 and 119 in Figure 23. At the same time the focusing plane F will be swung about a horizontal axis $y''$ which corresponds to the axis of the horizontal trunnions 111 and 112 in Figure 23.

It is possible by actuating both the knobs 122 and 123 to obtain any desired angular position of the film plane G and the focusing screen plane F within the limits of the ring's swing, which will be the result of the combined movements of all four swing rings 24—25 and 85—86.

(f) *Focusing hood and auxiliary mirror*

The top of the light trap 7 carries a disc-shaped light shield 130 that extends from the circular perimeter at the top of the trap to the inner spherical surface of the inner swing ring 24. This will prevent light rays from passing around the outer surface of the light trap and entering the camera box interior. The swing rings 24, 25, 85 and 86 are placed close enough together and their spherical surfaces will prevent the entrance of extraneous light into the camera box A.

The focusing head assembly is indicated at L in Figure 2. A rotatable head ring 131 is mounted on the circular perimeter of the swing ring 24, just above the ground glass focusing screen F. A selector lock comprising a spring-pressed pin 132 is carried by the ring and its inner end can enter any one of a number of recesses 133 arranged around the outer periphery of the ring 131. A spring 134 urges the pin 132 into the desired ring recess 133. It is possible to rotate the ring 131 through a complete 360°.

The hood C is pivoted to the side members of 136, Figure 2, at 135 and can swing from the substantially horizontal position shown in Figure 2 into the vertical position indicated by the dot dash lines. An elbow for the hood when in horizontal position is formed by two side members 136 having arcuate edges against which a flexible backing member 137 bears. The lower end of the backing member is secured to the ring 131 adjacent to the ring opening and the other end yieldingly bears against the inner surface of the hood. An auxiliary mirror 138 is pivoted at 139 and a torsional spring, not shown, is placed at the mirror pivot point for tending to swing the mirror in a clockwise direction when looking at Figure 2. A roller 140 is mounted at the top of the mirror and rides on the flexible backing member in contact with the hood interior.

When the hood is in the horizintal position shown in Figure 2, the auxiliary mirror 138 will reflect what image is cast on the ground glass F so that the operator can see the object when looking into the hood. The reflex camera can be used at the eye level of the operator due to this arrangement. The hood can be swung about a vertical axis through 360° due to the ring 131. As the hood C is swung into a vertical position, the auxiliary mirror will also swing into a vertical position, so as to be out of the way when the hood reaches the dot dash line position of Figure 2. The flexible backing memmer will also extend along the inner surface of the hood so as to be out of the way.

An aperture change kit comprising a disc 141, see Figure 2, covering the top of the ground glass, has a rectanagular opening corresponding to the rectangular area of the film plane G. When the film magazine D is swung from a vertical to a horizontal position, the aperture change kit disc 141 can be rotated 90° on the ground glass by means of the pin 142 so that the image on the ground glass will be properly framed, this frame occupying the same relative position as the film magazine.

(g) *Film numbering device*

We provide a film numbering device as shown in Figures 1, 2, 20 and 22. A card receiving pocket 143 is provided at the side of the film magazine D and a window 144 is placed on the inner side of the pocket, this window opening into the interior of the magazine and adapted to expose the number or other character printed on the card 145. A light 146 reflects the card character through a lens 147 and against a mirror 148 which in turn directs the light rays through a slot 149 in the runner 93 and against the sensitive emulsion margin of the film K. In this way the film will have the character on the card printed on the film margin. The card can be changed at will.

(h) *Intermittent film-moving mechanism*

In Figures 18 to 22, inclusive, and 26 to 28, inclusive, we show the film moving mechanism. The film take-up spool 95 in Figure 18 has a shaft 150 connected thereto and the shaft is connected to an intermittently moved shaft 151 by gearing at 152. Figure 21 illustrates a tube 153 mounted below the shafts 150 and 151, and a rack bar 154 of non-magnetic material is slidably mounted in the tube and is connected to a core or para-magnetic armature 155 which is also slidable in the tube. The tube 153 extends through a solenoid coil 156, and is supported at each end by brackets 153a and 153b, mounted on the lower portion of the magazine case D, see Figures 18 and 26, and has a slotted portion where the rack 154 is mounted.

Referring again to Figures 18 and 21, it will be seen that the rack meshes with a pinion 157 which in turn is rotatably mounted on the shaft 151. The pinion is rotated each time the rack is moved by the core 155 which in turn is moved by the energizing of the solenoid 156. Figure 26 illustrates a coil compression spring 158 mounted in the tube for the purpose of returning the core and the rack to their starting positions when the solenoid is deenergized. An adjustable stop which includes a short coil spring 159, Figure 18, is used for stopping the rack on its return movement.

The coil spring 159 bears against an adjustable disc 159a that is slidably received in the tube 153 and the compression of the spring is controlled by adjusting a screw 154a threaded in the bracket 153a and then locking the screw by the lock nut 154b. In a similar manner the compression of the spring 158, see Figure 26, may be adjusted by moving a disc 158a into the other end of the tube 153 and holding the disc in place by a screw 156a which is threaded into the bracket 153b. A lock nut 157a holds the screw in place. The movement of the rack in both directions can be controlled by these springs so that the rack will move properly on its return movement and be stopped at the required place after the solenoid 156 becomes deenergized.

A pawl 160 is pivotally carried by the pinion 157 and when the rack is moved by the energizing of the solenoid 156, the pawl will rotate a toothed ratchet 161 keyed to the shaft 151 and moving the shaft in a counter-clockwise direction, when looking at Figure 21, and the film take-up reel in a clockwise direction to wind the film K thereon. Upon deenergization of the solenoid 156, the spring 158, see Figure 26, will return the rack 154, thereby rotating the pinion 157 in the opposite direction and this will cause the pawl 160 to move over the ratchet 161 in a clockwise direction without rotating the ratchet. A holding pawl 162 prevents any clockwise movement of the ratchet 161. The film take-up spool will therefore be intermittently rotated by the repeated energizations of the solenoid 156.

An oscillator switch 163 is supported adjacent to the tube 153, see Figures 26, 27 and 28 and has a switch arm 164 that bears against a switch On-Off lag cam 165, see Figure 29. The cam is rotatably mounted on an upright shaft 166 and is held against the top face of a gear 167 by a compression spring 168. The gear 167 meshes with a rack 169 that in turn is reciprocated by the solenoid core 155 and the tube 153 is slotted to permit the meshing of a non-magnetic gear and rack. A timing plate 170 is secured to the upper surface of the gear 167 and a movement of the core 155 caused by the energizing of the solenoid 156 will rotate the gear clockwise when looking at Figure 27 and will bring the plate 170 against a radial edge 171 of the cam, this edge depending below the enlarged disc-shaped base 165a of the cam. The base 165a supports an upstanding cylindrical portion 165b of a smaller diameter and from this a quarter segment 165c projects laterally and it is this portion against which the arm 164 bears. As soon as the plate 170 strikes the edge 171, the quarter segment 165c will rotate to free the arm 164 and permit the switch 163 to open. The opening of the switch deenergizes the solenoid 156 in a manner to be shown in the wiring diagram, and the spring 158 will return the parts to starting position and the quarter segment 165c will again close the circuit. This intermittent energization of the solenoid 156 will rapidly continue until the proper amount of film has been wound on the take up spool.

(j) *Wiring diagram and operation of the reflex camera*

The wiring diagram is set forth in Figure 31 with the camera case section A being shown by the left hand dot dash rectangle in this figure and the film magazine section D shown by the right hand dot dash rectangle. A six line cable interconnects the electrical parts in both the camera section and the film magazine section.

Assume that the operator wishes to make an instantaneous exposure. He first removes a safety slide 171, see Figure 19, from the slot 83b that positions the slide in front of the sensitized film plane G. The removal of the slide permits the split contact safety slide switch 172, see Figure 18, to open the eighteen volt current line from the eighteen volt secondary of the transformer 173 to the safety slide warning light 174, see Figure 1, whereby the light will be put out. The lower contact points 172a of the switch 172 are opened when the slide 171 is removed. At the same time the split contact switch 172 will close the upper contact points 172b and will close a circuit to a push button or hand operated bulb switch 175 for the operator because the film runout switch 176, supported by the aperture gate assembly 96, see Figure 18, will close contact 176a due to a film K extending over the film plane and raising the switch arm connected with the switch for closing the contact. The film runout switch contact 176a is kept closed until the entire film has been run through the film magazine. The dual contacts 177 and 178 of the bulb switch 175 will now be connected to one side of the current source through wire 178a, switch 176, contacts 172b, and wire 178b.

The operator in depressing the push button 175, first connects the contact 178 with a contact 179 momentarily and closes a circuit through the wire 179a to the reset solenoid 180, and to ground, see Figures 4 and 31. This causes the core 181 of the solenoid 180 to strike the reset button of a mirror release reset switch 182, see Figure 4, to close the switch.

The complete depressing of the push button 175 will connect the contact 177 with a contact 183 and current will flow through wire 183a to the closed reset switch 182 and to the mirror latch release solenoid 16, see Figure 4; actuating the mirror release latch 15 to free the stop 13 and permit the spring 14, see Figure 5, to close the mirror E against the lower end of the light trap. The swinging of the latch 15 to free the stop 13 also causes the latch to open the reset switch 182 and this switch is ready for a subsequent closing upon the release of the push button 175. It will further be seen from Figures 3 and 4 that the swinging of the latch 15 to free the mirror stop 13 will also permit a shutter lift switch 184 to open and break the circuit flowing through this switch.

The mirror E when in its upper position will close the lower curtain release split contact single throw switch 185, see Figure 5, by a lower curtain release switch tripping arm 186, carried by the mirror end support 9. It will also close the upper curtain release switch 187, see Figures 3 and 4, by an upper curtain release switch tripping arm 188. Current will flow from wire 178a through wire 185a, through the closed lower curtain release switch 185, contact 185c, wire 67a to the lower curtain release solenoid 67 and then to ground. Current will also flow from wire 67a through contact points 189a of the split contact switch 189 and thence through wire 74a to the upper curtain release solenoid 74 and to ground.

At the instant the lower curtain release switch 185 is closed by the raising of the mirror E, current is supplied from one side of the eighteen volt secondary of the transformer 173 through wire 185a, switch contact 185b, wire 146a, numbering device light 146, and back to the other side of the eighteen volt outlet of the transformer. The character on the card 145 will be photographed on the emulsion side of the film K as already explained, see Figure 22. Both curtains H and J will be released by the energizing of the coils 67 and 74 and the spring rollers 33 and 45, see Figure 6, will wind them to move the shutter slot 84, see Figure 9, across the sensitized film for taking the picture.

The moving of the upper curtain H, to its lowermost point causes the strip 30 to close the mirror reset solenoid and intermittent oscillator switch 190, see Figure 6. Current will be supplied to the mirror reset solenoid 21 through wire 21a and then to ground, see Figure 5. The mirror E will be swung into its lower or operative position. The current will also flow to solenoid 191 through wire 191a and from there to ground. This solenoid is for the purpose of keeping track of the number of pictures taken of each subject automatically. The solenoid 191 is illustrated in Figure 2 as automatically actuating a mechanical counter 192 for each picture taken. The counter will operate with either roll film or cut film and it must be reset to zero manually by means of the knob 193, see Figure 1, for each subject being photographed.

The current will also be supplied to the mirror reset solenoid 21, resetting the mirror E to its operative and latched position which closes the shutter lift switch 184 (previously opened by the unlatching of mirror E), and permits current to flow through wire 178a, wire 184a, through curtain lifting break switch 198 which is in series with switch 184, (switch 198 being previously closed by the dropping of the lower curtain lifting bar 49, see Figure 8) to the shutter lift reset solenoids 58 and then to ground. When the bar 49 reaches its uppermost position, switch 198 is again opened.

The current will also flow to the cam operated switch 163 of Figure 27, which is in "On" position, from wire 163a that connects with wire 191a, leading from solenoid 191. The solenoid 156 will be energized and the current will flow to ground. The cam 165 causes an intermittent flow of current to the solenoid 156, which is momentarily energized by closing of the switch 190, so that the film take-up spool 95 will be started in its intermittent rotation for winding up the exposed film. This will be described more fully hereinafter. Each time the switch 163 cuts off the flow of current to the solenoid 156, the spring 159 will return the parts to starting position which will cause the gear 167 to swing the timing plate 170 to the position shown in Figure 27. The quarter segment 165c will move to cause the switch 163 to again close. The plate 170 causes a time lag before the current is again cut off from the solenoid 156.

The current will also flow through wire 194a from wire 163a, to an aperture track double throw switch 194 used in connection with the full length picture movement of the film, see Figure 31, and this switch is also shown in Figure 18, supported by the aperture gate assembly 96. The margin of the film K has been previously provided with perforations K1 at spaced distances equal to the length of the aperture opening in the film magazine D. The purpose of this switch 194 will be set forth shortly.

The current flows on to the film roll exposure counter solenoid 195 from wire 195a and lower contact 194b of switch 194 and thence to ground when the switch actuating button for switch 194 is in a film perforation K₁. The solenoid 195 actuates another mechanical counter 196, see Figure 1, and similar to the counter 192. This counter 196 keeps track of the number of exposures made or remaining to be made on the film roll while the counter 192 keeps track of the number of pictures taken of each subject. The counter 196 is manually set by the knob 197 for the total number of exposures the roll of film can make and is designed to have one number subtracted each time it is operated. As each full aperture picture is taken, the solenoid 195 will be energized to subtract one number from the total indicated by the counter and this continues until a zero reading is reached at which time the operator knows the entire film has been used.

As soon as the momentary movement of the film K moves a film portion under the button of switch 194, the switch will break 194b contact and close 194c contact. Current will now flow from wire 178a through double throw switch 199 (contact 199a) through contact 194c, wire 194a, the oscillator cam switch 163 to the solenoid 156 to ground, maintaining the intermittent movement of the film K until the button of switch 194 is opened by registering with the next film perforation K₂; see film K in Figure 30. This completes the moving of a new film section over the film aperture in the magazine ready for the next exposure.

Before explaining the taking of pictures one-half the length of the aperture opening of the film magazine, it is best to briefly set forth the circuits used when taking a time exposure. In taking a time exposure, the knob 76 is depressed by the operator to free pin 78, see Figure 16, from its recess 79, whereupon the knob can be rotated clockwise when looking at Figure 17, to bring the pin into contact with the plate 80. The drum 77 is maintained in its innermost position by the pin 78 resting against the outer surface of plate 81. The drum in being moved inwardly depresses a contact actuating button 78a for closing contacts 189b in Figure 31.

The operator in taking the time exposure, depresses bulb switch button 175, and current flows through contacts 177 and 183, wire 183a, bulb reset switch 182, mirror latch release solenoid 16, and thence to ground. This releases mirror E as previously explained and the mirror upon closing or swinging into inoperative position, closes switches 185 and 187 and current will flow from wire 178a through wire 185a, switch split contact 185c, wire 67a, to the lower curtain release solenoid 67 and to ground. The lower curtain will be released and it will be wound on its roller to uncover the shutter aperture and expose the film.

The film will continue to be exposed so long as the switch 175 is kept depressed. Upon releasing the bulb switch 175, contacts 178 and 179 are momentarily closed and current will flow through wire 179b, see Figure 31, contacts 189b of the split contact switch 189, upper curtain release switch 187, wire 74a to the upper curtain release solenoid 74 and then to ground. The upper curtain is released and closes the shutter aperture opening 21, completing the time exposure. The sequence of resetting the mirror and shutter will follow in the same manner as described for the taking of instantaneous pictures. The bulb reset switch solenoid 180 will also be actuated on the momentary closing of switch contacts 178 and 179, resetting the bulb reset switch 182, so it will be closed ready for the next closing of the bulb switch 175.

When the operator wishes to take pictures one-half the length of the aperture opening, he places kit slide 171a in the slot 88b. The center of the one-half picture size opening (not shown) in the slide 171a is coaxially centered with the $x$ axis of the camera, see Figures 2 and 30. The placing of the slide 171a in the magazine D, opens 199a contact and closes 199b contact. The slide 171a has an aperture which will register with the button of the safety slide switch 172, see Figure 18, keeping the switch 172 closed to contacts 172b. The previous cycle of exposure for the full length picture, already explained, will be repeated for taking the smaller size picture.

A single throw auxiliary switch 200 is in series with a switch 201 which is used for stopping the travel of the film after it has moved one-half its normal movement, and this is accomplished electrically as follows: Current flows from wire 178a through switch contact 199b to switch contact 201a and switch 200 (when the film perforation K₂, shown in dotted lines in Figure 30, has been moved away from the switch 200 by the momentary closing of switch 190, which energizes solenoid 156 through the intermittent cam switch 163 to ground, thus closing switch 200). Since switch 200 is closed by the film moving its perforation K₂ away from the button of this switch, the film will continue moving until the perforation K₂ registers with the button of a switch 201, placed a half a film picture length from the switch 200, and causing it to close contact 201b and open contact 201a (see the full line showing of perforation K₂ in Figure 30). This stops the film movement after it has been moved one-half its usual travel because contact 201a will be opened and current to the solenoid 156 will be cut off.

The closing contact 201b lights film size change light 202, the low voltage current flowing from one side of the secondary of the transformer 173, through wire 178a, through switch 199b contact, switch 201b, light 202, see Figures 1 and 30, and back to the opposite end of the transformer secondary. When the size change light 202 is on, it indicates to the operator that the half size change kit 171a may be removed so that the full aperture picture may be taken with a minimum of film loss.

Upon taking the next half size film exposure, the photographic cycle previously explained will take place, moving the film perforation K₂ out from under the switch button of switch 201, thereby closing 201a contact and opening 201b contact. This cuts off the current flowing to the size change light 202. The closing of contact 201a causes current to flow through switch 200 which continues supplying current to the oscillator cam switch 163 and solenoid 156, and thence to ground. The film K will therefore continue moving until the next film perforation K₃, see Figure 30, registers with the button of switch 200, thereby opening the switch and breaking the current to the solenoid 156. The film will therefore again stop after moving half its distance. As each successive half size picture is taken, the switches 200 and 201 alternate in cutting off the supply of current to the solenoid 156, thereby stopping the film at every half picture length of film with no loss between adjacent film exposures.

When the last film exposure has been made, whether of the full aperture or half aperture size, the film will continue to move due to the absence of any further film perforations K₁, and the film safety trailer will be wound around the sensitized film on the take-up spool. In order to stop the film moving mechanism from operating after a portion of the film safety trailer has been wound to protect the exposed film, the trailer has a perforation similar to K1, but on the opposite film trailer margin, and this perforation registers with the button of the film run-out switch 176, closing contact 176b, and opening contact 176a. The low voltage current will flow from the secondary of the transformer 173, through wire 178a, contact 176b, through film run-out light 203 and back to the transformer, lighting this light. The opening of contact 176a stops further flow of current to the entire camera mechanism. The safety slide 171 can be inserted and the film take-up spool removed.

If it is desired to remove the magazine D for attaching a cut-film adapter back (not shown), to the camera, a switch 204 is closed, seee Figure 31, which will place the camera mechanism shown in the dot dash rectangle of Figure 31, in operation with the current source even though the film magazine D is removed. The counter 196 will become inoperative while the counter 192 will continue to function for the cut film.

We claim:

1. In a reflex camera, in combination, a lens, a focusing screen, a light trap therefor, a hinged mirror swingable from operative to inoperative position to close the light trap, solenoid actuated means for swinging the mirror into operative position to reflect light rays from the lens onto the screen, a pawl for holding the mirror in operative position, a stop carried by the mirror and moveable to be engaged by the pawl when the mirror is moved into operative position, whereby the mirror will be held in operative position, electrically controlled means for freeing the pawl from the stop, and spring means for urging the mirror into inoperative position when the pawl is freed from the stop.

2. In a reflex camera, a mirror swingable from operative to inoperative position, a shutter having an opening, a lower curtain normally closing the opening, a spring-actuated roller for winding up the curtain for uncovering the opening, electrically controlled release means for supporting the curtain in closed position, an upper curtain, a second spring-actuated roller, means interconnecting the upper curtain with the second roller for causing the latter to move the former over the shutter opening, electrically controlled release means for holding the upper curtain from moving over the opening, electrically actuated mirror release means, spring means for swinging the mirror into inoperative position, a two position manually controlled switch movable into one position for closing a circuit to the mirror release means for freeing the mirror, and a switch closed when the mirror is closed for causing the lower curtain release means to free the curtain to uncover the shutter opening, said manual switch being movable into a second position for closing a circuit to the upper curtain release means for freeing the upper curtain and permitting it to cover the opening, electrically actuated curtain reset means for returning both curtains to their starting positions, a switch closed by the completion of the downward movement of the upper curtain for energizing the reset means, whereby the curtains are raised to their starting position, and a switch in series with said last-named switch for disconnecting the current to the reset means when the curtains reach their starting positions.

3. In a reflex camera, a mirror swingable from operative to inoperative position, a stop for holding the mirror in operative position, spring means for swinging the mirror into inoperative position when the mirror is freed, electrically controlled means for freeing the mirror from the stop, a manually controlled switch for closing a circuit to the electric means for freeing the mirror and permitting it to move into inoperative position, a shutter panel having an opening, a lower curtain normally closing the opening, a spring-actuated roller for winding the curtain to uncover the opening, means holding the lower curtain in covering relation over the shutter panel opening, an upper curtain, a second spring-actuated roller for winding the upper curtain to uncover the opening, a third spring-actuated roller having a stronger spring than the second, cables wound on the third roller and connected to the upper curtain for pulling it over the opening when the upper curtain is freed, electric means for freeing the lower curtain holding means, manually controlled connections between the first and third rollers for separating the lower and upper curtains the desired distance to provide a scanning slot therebetween and for causing the first and third rollers to rotate in unison for moving the slot across the shutter opening, a switch closed by the swinging of the mirror into inoperative position for causing the electric means to free the lower curtain, electrically actuated film feeding mechanism for bringing a film portion into registration with the shutter panel opening, a film moved by the film moving mechanism and having perforations in its side, a second switch closed by the dropping of the upper curtain into closed position for causing the film feeding means to bring another film section into registration with the shutter opening, and a third switch in series with the said second switch and kept closed by the film bearing thereagainst, the third named switch opening when a film perforation registers therewith, whereby the film is brought to a stop when another film section registers with the shutter opening.

4. In a reflex camera; a lens, a focusing screen; a light trap therefor; a hinged mirror swingable from operative to inoperative position to close the light trap; a shutter panel having an opening; a pair of curtains movable across the opening and having their ends spaced from each other to provide a scanning slot that will traverse the opening during the curtain movement; means for moving the curtains for causing the slot to traverse the opening; electrically-controlled curtain release means for supporting the curtains with the slot out of registration with the opening; electrically-actuated mirror release means; spring means for swinging the mirror into inoperative position to close the light trap when the mirror release means is actuated; a manually controlled switch for closing a circuit to the mirror release means for freeing the mirror whereupon the mirror will swing into inoperative position; and a switch closed by the mirror moving into inoperative position and closing a circuit to the curtain release means for freeing the curtains and permitting the first-mentioned means to move the slot across the opening.

5. In a reflex camera; a lens mount; a focusing screen having a light trap; a hinged mirror swingable from operative into inoperative position, the mirror when in operative position reflecting light rays from the lens to the screen and when in inoperative position, closing the light trap; electrically controlled means for swinging the mirror into operative or inoperative position; a film support; a shutter positioned between said lens mount and said film support; said shutter comprising a light-tight partition having an aperture therein; a pair of curtains; one of said curtains being movable from a position juxtaposed to said aperture into a position therebelow and the other curtain being movable from a position juxtaposed to said aperture to a position thereabove; means for simultaneously moving both curtains into their respective uppermost positions; means constantly urging said curtains into their lowermost positions; a pair of separately releasable latching means for independently normally retaining said respective curtains in their uppermost positions; separate electric means for independently releasing the respective latching means of said last pair; a switch for the latch-releasing means and closed by the mirror swinging into inoperative position; a manually controlled switch for the mirror controlling means; said manual switch being placed in series with the latch releasing switch only when the mirror is in inoperative position; whereby the shutter curtains can only be released when the mirror is in inoperative position; said curtain lowering means including means for maintaining a scanning slot between the two curtains as they traverse the shutter opening.

6. In a reflex camera; a lens mount; a focusing screen having a light trap; a hinged mirror swingable from operative into inoperative position; the mirror when in operative position reflecting light rays from the lens to the screen and when in inoperative position, closing the light trap; spring means for swinging the mirror into inoperative position; electrically controlled means for swinging the mirror into operative position, said electric means being adapted to free the mirror to permit it to swing into inoperative position; a film support; a shutter positioned between said lens mount and said film support; said shutter comprising a light-tight partition having an aperture therein; a pair of curtains; one of said curtains being movable from a position juxtaposed to said aperture to a position therebelow and the other curtain being movable from a position juxtaposed to said aperture to a position thereabove; means for simultaneously moving both curtains into their respective uppermost positions; means constantly urging said curtains into their lowermost positions; a pair of latches for normally engaging with and retaining said respective curtains in their respective uppermost positions; a pair of solenoids for independently releasing the respective latching means; a source of current for energizing said solenoids; a manually controlled switch for connecting the current source with the electrically controlled means for the mirror for freeing the mirror so that it will swing into inoperative position; a switch in series with the manual switch and being closed by the mirror as the latter reaches its inoperative position; said last named switch connecting the current source with the solenoids when the mirror actuated switch is closed and the manual controlled switch remains closed; whereby the latching means are freed and the curtains will be moved into their lowermost positions; said curtain lowering means including means for maintaining a scanning slot between the two curtains as they traverse the shutter opening; a mirror reset switch closed only at the time the curtains reach their lowermost positions for connecting the current to the means that swings the mirror into operative position; and a shutter lift switch closed by the mirror as it reaches operative position and connecting the current source with the curtain raising means for lifting the curtains.

7. In a reflex camera; a lens; a focusing screen; a light trap therefor; a hinged mirror swingable from operative position to reflect light rays from the lens to the screen, into inoperative position to close the light trap; electrically controlled means for swinging the mirror into operative or inoperative positions; a shutter panel having an opening for receiving light rays from the lens; a pair of curtains; one of said curtains being movable from a position juxtaposed to said opening into a position therebelow and the other curtain being movable from a position juxtaposed to said opening to a position thereabove; means constantly urging said curtains into their lowermost positions; a pair of separately releasable latching means for independently normally retaining said respective curtains in their uppermost positions; separate electric means for independently releasing the respective latching means of said last pair; a manual switch closed for connecting a current source with the mirror control means for permitting the mirror to swing into inoperative position; spring means for swinging the mirror into inoperative position when the mirror is freed by the electrically controlled means; a switch for the latch-releasing means in series with the manual switch and closed by the mirror at the time the latter reaches its inoperative position; whereby the shutter curtains can only be released when the mirror reaches inoperative position; and means for maintaining a fixed scanning slot between the adjacent ends of the curtains as the latter are lowered; whereby the scanning slot is moved across the shutter opening.

8. In a reflex camera; a lens; a focusing screen; a film support; a hinged mirror swingable from operative to inoperative position, the mirror when in operative position reflecting light rays from the lens onto the screen and when in inoperative position covering the screen and permitting light rays from the lens to pass to a film on the film support; electrically-controlled means for freeing the mirror for permitting it to swing from operative into inoperative position; a shutter panel positioned between the lens and the film support and having an opening for exposing the film; upper and lower curtains; the lower curtain being movable from a position juxtaposed to said opening to a position therebelow and the upper curtain being movable from a position juxtaposed to said opening to a position thereabove; means for simultaneously moving both curtains into their respective uppermost positions; means constantly urging said curtains into their lowermost positions; electrically-controlled and independent latching means for each curtain for holding said respective curtains in their respective uppermost positions; a two position manually controlled switch; said switch when moved into one of its positions, connecting a source of current with the electrically controlled means for the mirror for freeing the mirror whereby it will swing into inoperative position; a switch for both electrically controlled curtain latching means and being in series with the manual switch and closed by the movement of the mirror as it reaches its inoperative position; whereby the curtains are both freed from the latching means; manually controlled time indicating means including a mechanism operatively connected to the curtain lowering means when the time indicating means is set for instant exposure, for spacing the adjacent edges of the curtains the desired distance apart for forming a scanning slot, the mechanism maintaining the slot at the same size while the slot is being moved across the panel opening as the curtains are lowered for taking an instantaneous picture on the film; the time controlled mechanism being adjustable for a time exposure to permit the two curtains to be lowered independently of each other; a time control switch actuated by the time control mechanism when adjusted for taking a time exposed picture, actuating the electrically controlled latch releasing means for the upper curtain, from the said mirror closed switch, and for placing it in series with the second position of the manually controlled switch; whereby the lower curtain uncovers the panel opening when the two position manually controlled switch is moved into its first position and the mirror is in inoperative position, and the upper curtain is lowered to cover the panel opening to complete the time exposure when the manual switch is moved into its second position.

9. In a reflex camera; a lens; a focusing screen; a film support; a hinged mirror swingable from operative to inoperative position, the mirror when in operative position reflecting light rays from the lens onto the screen and when in inoperative position covering the screen and permitting light rays from the lens to pass to a film on the film support; electrically-controlled means for freeing the mirror for permitting it to swing from operative into inoperative position; a shutter panel positioned between the lens and the film support and having an opening for exposing the film; upper and lower curtains; the lower curtain being movable from a position juxtaposed to said opening to a position therebelow and the upper curtain being movable from a position juxtaposed to said opening to a position thereabove; means for simultaneously moving both curtains into their respective uppermost positions; means constantly urging said curtains into their lowermost positions; electrically-controlled and independent latching means for each curtain for holding said respective curtains in their respective uppermost positions; a two position manually controlled switch; said switch when moved into one of its positions, connecting a source of current with the electrically controlled means for the mirror for freeing the mirror whereby it will swing into inoperative position; a switch for both electrically-controlled curtain latching means and being in series with the manual switch and closed by the movement of the mirror as it reaches its inoperative position, whereby the curtains are both freed from the latching means; manually controlled time indicating means including a mechanism operatively connected to the curtain lowering means when the time indicating means is set for instant exposure, for spacing the adjacent edges of the curtains the desired distance apart for forming a scanning slot, the mechanism maintaining the slot at the same size while the slot is being moved across the panel opening as the curtains are lowered for taking an instantaneous picture on the film; the time controlled mechanism being adjustable for a time exposure to permit the two curtains to be lowered independently of each other; a time control switch actuated by the time control mechanism when adjusted for taking a time exposed picture, actuating the electrically controlled latch releasing means for the upper curtain, from the said mirror closed switch, and for placing it in series with the second position of the manually controlled switch; whereby the lower curtain uncovers the panel opening when the two position manually controlled switch is moved into its first position and the mirror is in inoperative position, and the upper curtain is lowered to cover the panel opening to complete the time exposure when the manual switch is moved into its second position; electric means for swinging the mirror into operative position; a switch closed by the upper curtain covering the panel opening for actuating the means that swings the mirror into operative position; and a shutter lift switch connected to the curtain raising means and being closed by the mirror returning to its operative position.

10. In a reflex camera; a lens; a focusing screen; a film support; a hinged mirror swingable from operative to inoperative position, the mirror when in operative position reflecting light rays from the lens onto the screen and when in inoperative position covering the screen and permitting light rays from the lens to pass to a film on the film support; electrically-controlled means for freeing the mirror for permitting it to swing from operative into inoperative position; a shutter panel positioned between the lens and the film support and having an opening for exposing the film; upper and lower curtains; the lower curtain being movable from a position juxtaposed to said opening to a position therebelow and the upper curtain being movable from a position juxtaposed to said opening to a position thereabove; means for simultaneously moving both curtains into their respective uppermost positions; means constantly urging said curtains into their lowermost positions; electrically-controlled and independent latching means for each curtain for holding said respective curtains in their respective uppermost positions; a two-position manually controlled switch; said switch when moved into one of its positions, connecting a source of current with the electrically controlled means for the mirror for freeing the mirror whereby it will swing into inoperative position; a switch for both electrically-controlled curtain latching means and being in series with the manual switch and closed by the movement of the mirror as it reaches its inoperative position; whereby the curtains are both freed from the latching means; manually controlled time indicating means including a mechanism operatively connected to the curtain lowering means when the time indicating means is set for instant exposure, for spacing the adjacent edges of the curtains the desired distance apart for forming a scanning slot, the mechanism maintaining the slot, at the same size while the slot is being moved across the panel opening as the curtains are lowered for taking an instantaneous picture on the film; the time controlled mechanism being adjustable for a time exposure to permit the two curtains to be lowered independently of each other; a time control switch actuated by the time control mechanism when adjusted for taking a time exposed picture; actuating the electrically controlled latch releasing means for the upper curtain, from the said mirror closed switch, and for placing it in series with the second position of the manually controlled switch; whereby the lower curtain uncovers the panel opening when the two-position manually controlled switch is moved into its first position and the mirror is in inoperative position; and the upper curtain is lowered to cover the panel opening to complete the time exposure when the manual switch is moved into its second position; electric means for swinging the mirror into operative position; a switch closed by the upper curtain covering the panel opening for actuating the means that swings the mirror into operative position; a shutter lift switch connected to the curtain raising means and being closed by the mirror returning to its operative position; electric means for feeding an unexposed section of film into a position on the film support for exposure when the shutter curtains again uncover the panel opening; the switch that is connected to the electric means for swinging the mirror back into operative position, also being connected to the film feeding means so that a closing of this switch by the upper curtain reaching its lowermost position will bring another film section into a position for exposure.

11. In a reflex camera; a lens, a focusing screen; a film support; a hinged mirror swingable from operative to inoperative position, the mirror when in operative position reflecting light rays from the lens onto the screen and when in inoperative position covering the screen and permitting light rays from the lens to pass to a film on the film support; electrically controlled means for freeing the mirror for permitting it to swing from operative into inoperative position; a shutter panel positioned between the lens and the film support and having an opening for exposing the film; upper and lower curtains; the lower curtains being movable from a position juxtaposed to said opening to a position therebelow and the upper curtain being movable from a position juxtaposed to said opening to a position thereabove; means for simultaneously moving both curtains into their respective uppermost positions; means constantly urging said curtains into their lowermost positions; electrically controlled and independent latching means for each curtain for holding said respective curtains in their respective uppermost positions; a two-position manually controlled switch; said switch when moved into one of its positions, connecting a source of current with the electrically controlled means for the mirror for freeing the mirror whereby it will swing into inoperative position; a switch for actuating the electrically controlled latch releasing means for the lower curtain and being in series with the manual switch and closed by the movement of the mirror as it reaches inoperative position; whereby the lower curtain will be freed from its latching means, when the manual switch is moved into its first position and the mirror actuated switch is closed; a second mirror actuated switch closed by the mirror as it reaches its inoperative position and being in series with the second position of the manual switch for connecting the electrically controlled latch releasing means for the upper curtain with the source of current when the manual switch is moved into its second position and the second named mirror actuated switch is closed.

12. In a reflex camera; a lens; a focusing screen; a film support; a hinged mirror swingable from operative to inoperative position, the mirror when in operative position reflecting light rays from the lens onto the screen and when in inoperative position covering the screen and permitting light rays from the lens to pass to a film on the film support; electrically controlled means for freeing the mirror for permitting it to swing from operative into inoperative position; a shutter panel positioned between the lens and the film support and having an opening for exposing the film; upper and lower curtains; the lower curtain being movable from a position juxtaposed to said opening to a position therebelow and the upper curtain being movable from a position juxtaposed to said opening to a position thereabove; means for simultaneously moving both curtains into their respective uppermost positions; means constantly urging said curtains into their lowermost positions; electrically controlled and independent latching means for each curtain for holding said respective curtains in their respective uppermost positions; a two-position manually controlled switch; said switch when moved into one of its positions, connecting a source of current with the electrically controlled means for the mirror for freeing the mirror whereby it will swing into inoperative position; a switch for actuating the electrically controlled latch releasing means for the lower curtain and being in series with the manual switch and closed by the movement of the mirror as it reaches inoperative position; whereby the lower curtain will be freed from its latching means, when the manual switch is moved into its first position and the mirror actuated switch is closed; a second mirror actuated switch closed by the mirror as it reaches its inoperative position and being in series with the second position of the manual switch for connecting the electrically controlled latch releasing means for the upper curtain with the source of current when the manual switch is moved into its second position and the second named mirror actuated switch is closed; electric means for swinging the mirror into operative position; a switch closed by the upper curtain covering the panel opening for actuating the means that swings the mirror into operative position; and a shutter lift switch connected to the curtain raising means and being closed by the mirror returning to its operative position.

13. In a reflex camera; a lens; a focusing screen; a film support; a hinged mirror swingable from operative to inoperative position, the mirror when in operative position reflecting light rays from the lens onto the screen and when in inoperative position covering the screen and permitting light rays from the lens to pass to a film on the film support; electrically controlled means for freeing the mirror for permitting it to swing from operative into inoperative position; a shutter panel positioned between the lens and the film support and having an opening for exposing the film; upper and lower curtains; the lower curtain being movable from a position juxtaposed to said opening to a position therebelow and the upper curtain being movable from a position juxtaposed to said opening to a position thereabove; means for simultaneously moving both curtains into their respective uppermost positions; means constantly urging said curtains into their lowermost positions; electrically controlled and independent latching means for each curtain for holding said respective curtains in their respective uppermost positions; a two-position manually controlled switch; said switch when moved into one of its positions, connecting a source of current with the electrically controlled means for the mirror for freeing the mirror whereby it will swing into inoperative position; a switch for actuating the electrically controlled latch releasing means for the lower curtain and being in series with the manual switch and closed by the movement of the mirror as it reaches inoperative position; whereby the lower curtain will be freed from its latching means, when the manual switch is moved into its first position and the mirror actuated switch is closed; a second mirror actuated switch closed by the mirror as it reaches its inoperative position and being in series with the second position of the manual switch for connecting the electrically controlled latch releasing means for the upper curtain with the source of current when the manual switch is moved into its second position and the second named mirror actuated switch is closed; electric means for swinging the mirror into operative position; a switch closed by the upper curtain covering the panel opening for actuating the means that swings the mirror into operative position; a shutter lift switch connected to the curtain raising means and being closed by the mirror returning to its operative position; electric means for feeding an unexposed section of film into a position on the film support for exposure when the shutter curtains again uncover the panel opening; the switch that is connected to the electric means for swinging the mirror back into operative position, also being connected to the film feeding means so that a closing of this switch by the upper curtain reaching its lowermost position will bring another film section into a position for exposure.

GEORGE M. WALTERS.
RUSSELL W. WALTERS.

REFERENCES CITED

The following references are of record in the file of this patent:

UNITED STATES PATENTS

| Number | Name | Date |
|---|---|---|
| 589,349 | Holst | Aug. 31, 1897 |
| 1,363,414 | Hofmann et al. | Dec. 28, 1920 |
| 1,473,902 | Charbeneau | Nov. 13, 1923 |
| 1,746,741 | Reiterer et al. | Feb. 11, 1930 |
| 1,963,107 | Walters | June 19, 1934 |
| 2,101,652 | Robles | Dec. 7, 1937 |
| 2,213,741 | Mihalyi | Sept. 3, 1940 |
| 2,234,345 | Hersberg | Mar. 11, 1941 |
| 2,257,012 | Hineline | Sept. 23, 1941 |
| 2,282,284 | Hineline | May 5, 1942 |
| 2,309,300 | Briechle et al. | Jan. 26, 1943 |
| 2,322,734 | Steiner | June 22, 1943 |
| 2,380,034 | Doyle | July 10, 1945 |
| 2,398,133 | Cronholm | Apr. 9, 1946 |